(12) United States Patent
Long et al.

(10) Patent No.: US 11,611,615 B1
(45) Date of Patent: Mar. 21, 2023

(54) DECENTRALIZED EDGE STORAGE NETWORK WITH FLEXIBLE FILE SHARDING

(71) Applicant: Theta Labs, Inc., San Jose, CA (US)

(72) Inventors: Jieyi Long, Santa Clara, CA (US); Mitchell C. Liu, Los Altos, CA (US)

(73) Assignee: Theta Labs, Inc., San Jose, CA (US)

( * ) Notice: Subject to any disclaimer, the term of this patent is extended or adjusted under 35 U.S.C. 154(b) by 0 days.

(21) Appl. No.: 17/988,088

(22) Filed: Nov. 16, 2022

Related U.S. Application Data

(60) Provisional application No. 63/311,065, filed on Feb. 17, 2022, provisional application No. 63/287,072, filed on Dec. 7, 2021.

(51) Int. Cl.
  *H04L 67/1074* (2022.01)
  *G06F 16/13* (2019.01)
  *H04L 67/1061* (2022.01)

(52) U.S. Cl.
  CPC .......... *H04L 67/108* (2013.01); *G06F 16/137* (2019.01); *H04L 67/1065* (2013.01)

(58) Field of Classification Search
  CPC ............... G06F 16/137; G06F 16/2255; G06F 11/1076; G06F 3/0616; G06F 3/067; H04L 67/1065; H04L 67/108; H04L 67/1095; H04L 67/1097; H04L 65/1069; H04L 9/3226; H04L 9/3229; H04L 9/3247; H04L 9/50
  See application file for complete search history.

(56) References Cited

U.S. PATENT DOCUMENTS

| | | | |
|---|---|---|---|
| 7,304,994 B2 | 12/2007 | Dubnicki et al. | |
| 7,870,218 B2 | 1/2011 | Dubnicki et al. | |
| 9,710,330 B2 * | 7/2017 | Cronie | G06F 11/1076 |
| 10,797,994 B1 | 10/2020 | Munson et al. | |
| 10,951,675 B2 * | 3/2021 | Long | H04L 65/1069 |
| 2006/0242155 A1 * | 10/2006 | Moore | H04L 67/1097 |
| 2019/0073152 A1 * | 3/2019 | Nagle | G06F 3/067 |
| 2019/0278765 A1 * | 9/2019 | Ying | G06F 16/2255 |
| 2020/0092362 A1 * | 3/2020 | Viswanathan | H04L 67/1095 |

(Continued)

OTHER PUBLICATIONS

Stoica, Ion, "Chord: A Scalable Peer-to-peer Lookup Protocol for Internet Applications," IEEE/ACM Transactions on Networking, vol. 11, Issue 1, Feb. 2003, pp. 17-32.

*Primary Examiner* — Le H Luu
(74) *Attorney, Agent, or Firm* — American Patent Agency PC; Daniar Hussain

(57) ABSTRACT

Methods and systems for decentralized storage are provided. To store a file in a decentralized network, a source node in the decentralized network first divides the file into a plurality of file portions. For each given file portion, a corresponding peer storage node is located in the decentralized network, where a distance between the corresponding peer storage node and the given file portion is below a given threshold, where the distance is computed based on an identifier of the corresponding peer storage node, and an identifier of the given file portion, and where the given threshold is associated with a storage capacity of the corresponding peer storage node. The source node then transmits each given file portion to the corresponding peer storage node, and generates a file identifier for the file, based on the identifiers of the plurality of file portions.

20 Claims, 16 Drawing Sheets

(56) References Cited

U.S. PATENT DOCUMENTS

| | | | |
|---|---|---|---|
| 2021/0073177 A1* | 3/2021 | Chen | H04L 9/3239 |
| 2022/0019901 A1* | 1/2022 | Saleh | H04L 9/3247 |
| 2022/0045845 A1* | 2/2022 | Ow | H04L 9/3226 |
| 2022/0092025 A1* | 3/2022 | Vaideeswaran | G06F 3/0616 |
| 2022/0179843 A1* | 6/2022 | Irazabal | H04L 9/50 |
| 2022/0405765 A1* | 12/2022 | Bekiyants | H04L 9/3239 |

\* cited by examiner

1000

1100

1200

DECENTRALIZED EDGE STORAGE NETWORK WITH FLEXIBLE FILE SHARDING

REFERENCE TO RELATED APPLICATIONS

This application is a non-provisional of and claims the benefit of priority to provisional application U.S. Ser. No. 63/311,065, filed on 17 Feb. 2022, entitled "Decentralized Edge Storage Network and Associated Systems and Methods", and is also a non-provisional of and claims the benefit of priority to provisional application U.S. Ser. No. 63/287,072, filed on 7 Dec. 2021, entitled "Methods and Systems for Enhancing Data Streaming and Delivery Over a Decentralized Network", the entire disclosures of which are hereby incorporated by reference in their entireties herein.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of decentralized storage and/or resource sharing, and pertain particularly to methods and systems for file sharding in decentralized edge storage for the permanent web.

BACKGROUND OF THE INVENTION

The statements in this section may serve as a background to help understand the invention and its application and uses, but does not constitute prior art.

Web3 promises to be a revolutionary technology and a decentralized approach to next-generation application development. Web3 tools enable new categories of media, entertainment, and metaverse businesses to emerge, built on a new set of business economics and models that are community-first, decentralized, and controlled by creators, IP holders, and users themselves. For example, Web3 models may enable all stakeholders including end-user communities to participate in decentralized governance and key decision making. End-users may be incentivized to participate in a Web3 infrastructure to power the business service, and receive royalty or revenue share as IP holders or influencers. Emerging Web3 businesses in media and entertainment may launch and scale their services without skyrocketing infrastructure costs. That is, content creators, individually or as platforms, may implement video support in websites and applications with minimal need to invest in cloud infrastructure, data storage, data encoding and/or transcoding, and content delivery.

Existing content and website hosting service platforms are centralized, with content caching servers located at various major metropolitan geographic locations. A Web3 distributed content hosting service could be three to five times more cost effective by leveraging distributed storage technologies, with content cached and delivered to end-users much closer than traditional hosting providers' points-of-presence (POP) servers, and highly distributed and replicated across the network. Such decentralized storage may also enable new pricing models that accommodate peak traffic and leverage under-utilized resources from major telecom operators and network providers.

To enable Web3 decentralized storage, a core operation that needs to be efficiently implemented is the partitioning, distribution, and lookup of data items in a dynamically changing peer-to-peer network. Sharding is a type of database partitioning that breaks large datasets or files into smaller chunks, or shards, and stores them in separate devices or network nodes. Traditional sharding techniques are designed for centralized databases where the database operator has full control over the system, but this is difficult to implement in a fully decentralized network.

Therefore, in view of the aforementioned difficulties, there is an unsolved need to provide a decentralized storage platform, and data partitioning and distribution techniques that allow fast and efficient resource sharing by any user with any other user. It is against this background that various embodiments of the present invention were developed.

BRIEF SUMMARY OF THE INVENTION

Methods and systems are provided for a decentralized edge storage network.

More specifically, in one aspect, one embodiment of the present invention is a computer-implemented method for decentralized storage, the method including the steps of dividing, by a source node in a decentralized network, a file into a plurality of file portions; for each given file portion in the plurality of file portions, locating a corresponding peer storage node in the decentralized network, where a distance between the corresponding peer storage node and the given file portion is below a given threshold, where the distance is computed based on an identifier of the corresponding peer storage node, and an identifier of the given file portion, and where the given threshold is associated with a storage capacity of the corresponding peer storage node; transmitting, by the source node, each given file portion to the corresponding peer storage node; and generating, by the source node, a file identifier for the file, based on the identifiers of the plurality of file portions.

In some embodiments, for each given file portion in the plurality of file portions, the locating the corresponding peer storage node in the decentralized network includes gossiping the identifier of the given file portion through the decentralized network; and receiving a location notification from the corresponding peer storage node, where the location notification indicates that the distance between the corresponding peer storage node and the given file portion is below the given threshold associated with the storage capacity of the corresponding peer storage node.

In some embodiments, for each given file portion in the plurality of file portions, the locating the corresponding peer storage node in the decentralized network includes retrieving, by the source node, a list of registered peer storage nodes from a blockchain; and selecting the corresponding peer storage node from the list of registered peer storage nodes.

In some embodiments, the identifier of the corresponding peer storage node and the identifier of the given file portion are computed using a hash function.

In some embodiments, the identifier of the corresponding peer storage node is computed based on a crypto wallet address associated with the corresponding peer storage node.

In some embodiments, the generating of the file identifier comprises performing a vector commitment scheme on the identifiers of the plurality of file portions.

In some embodiments, the method further includes submitting the file identifier to a smart contract.

In some embodiments, the method further includes performing a distributed hash table (DHT) lookup using the file identifier, to determine the identifier of each of the plurality of file portions; for each given file portion of the plurality of file portions, performing a DHT lookup on the identifier of the given file portion to determine an address for a peer storage node storing the given file portion; retrieving each given file portion from the peer storage node storing the given file portion, using the determined address; and assembling the retrieved file portions into the file.

In another aspect, one embodiment of the present invention is a source node system in a decentralized network for decentralized storage, including at least one processor; and a non-transitory physical medium for storing program code accessible by the processor, the program code when executed by the processor causes the processor to: divide a file into a plurality of file portions; for each given file portion in the plurality of file portions, locate a corresponding peer storage node in the decentralized network, where a distance between the corresponding peer storage node and the given file portion is below a given threshold, where the distance is computed based on an identifier of the corresponding peer storage node, and an identifier of the given file portion, and where the given threshold is associated with a storage capacity of the corresponding peer storage node; transmit each given file portion to the corresponding peer storage node; and generate a file identifier for the file, based on the identifiers of the plurality of file portions.

In some embodiments, for each given file portion in the plurality of file portions, the program code to locate the corresponding peer storage node, when executed by the processor, causes the processor to: gossip the identifier of the given file portion through the decentralized network; and receive a location notification from the corresponding peer storage node, where the location notification indicates that the distance between the corresponding peer storage node and the given file portion is below the given threshold associated with the storage capacity of the corresponding peer storage node.

In some embodiments, for each given file portion in the plurality of file portions, the program code to locate the corresponding peer storage node, when executed by the processor, causes the processor to retrieve a list of registered peer storage nodes from a blockchain; and select the corresponding peer storage node from the list of registered peer storage nodes.

In some embodiments, the identifier of the corresponding peer storage node and the identifier of the given file portion are computed using a hash function.

In some embodiments, the identifier of the corresponding peer storage node is computed based on a crypto wallet address associated with the corresponding peer storage node.

In some embodiments, the program code to generate the file identifier, when executed by the processor, causes the processor to perform a vector commitment scheme on the identifiers of the plurality of file portions.

In some embodiments, the program code when executed by the processor further causes the processor to submit the file identifier to a smart contract.

In some embodiments, the program code when executed by the processor further causes the processor to: perform a distributed hash table (DHT) lookup using the file identifier, to determine the identifier of each of the plurality of file portions; for each given file portion of the plurality of file portions, perform a DHT lookup on the identifier of the given file portion to determine an address for a peer storage node storing the given file portion; retrieve each given file portion from the peer storage node storing the given file portion, using the determined address; and assemble the retrieved file portions into the file.

In yet another aspect, one embodiment of the present invention is a non-transitory physical medium for storing program code accessible by a processor on a source node system in a decentralized network for decentralized storage, the program code when executed by the processor causes the processor to divide a file into a plurality of file portions; for each given file portion in the plurality of file portions, locate a corresponding peer storage node in the decentralized network, where a distance between the corresponding peer storage node and the given file portion is below a given threshold, where the distance is computed based on an identifier of the corresponding peer storage node, and an identifier of the given file portion, and where the given threshold is associated with a storage capacity of the corresponding peer storage node; transmit each given file portion to the corresponding peer storage node; and generate a file identifier for the file, based on the identifiers of the plurality of file portions.

In some embodiments, for each given file portion in the plurality of file portions, the program code to locate the corresponding peer storage node, when executed by the processor, causes the processor to gossip the identifier of the given file portion through the decentralized network; and receive a location notification from the corresponding peer storage node, where the location notification indicates that the distance between the corresponding peer storage node and the given file portion is below the given threshold associated with the storage capacity of the corresponding peer storage node.

In some embodiments, for each given file portion in the plurality of file portions, the program code to locate the corresponding peer storage node, when executed by the processor, causes the processor to retrieve a list of registered peer storage nodes from a blockchain; and select the corresponding peer storage node from the list of registered peer storage nodes.

In some embodiments, the identifier of the corresponding peer storage node is computed based on a crypto wallet address associated with the corresponding peer storage node.

In yet another aspect, one embodiment of the present invention is a method for decentralized storage, the method including the steps of receiving, by a peer storage node, a file portion of a file, where the file is divided into a plurality of file portions by a source node; computing, by the peer storage node, a distance based on an identifier of the received file portion, and an identifier of the peer storage node; determining, by the peer storage node, whether the distance is below a threshold associated with a storage capacity of the peer storage node; and in response to determining that the distance is below the threshold, storing the received file portion in the peer storage node.

In some embodiments, the identifier of the peer storage node and the identifier of the received file portion are computed using a hash function.

In some embodiments, the identifier of the peer storage node is computed based on a crypto wallet address associated with the peer storage node.

In some embodiments, the method further comprises retrieving a random number R from a blockchain; computing a reward hash, based on the received file portion and the random number R; and submitting the reward hash to a smart contract on the blockchain.

Yet other aspects of the present invention include methods, processes, and algorithms comprising the steps described herein, and also include the processes and modes of operation of the systems and servers described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which.

DETAILED DESCRIPTION OF THE INVENTION

Figure 1:
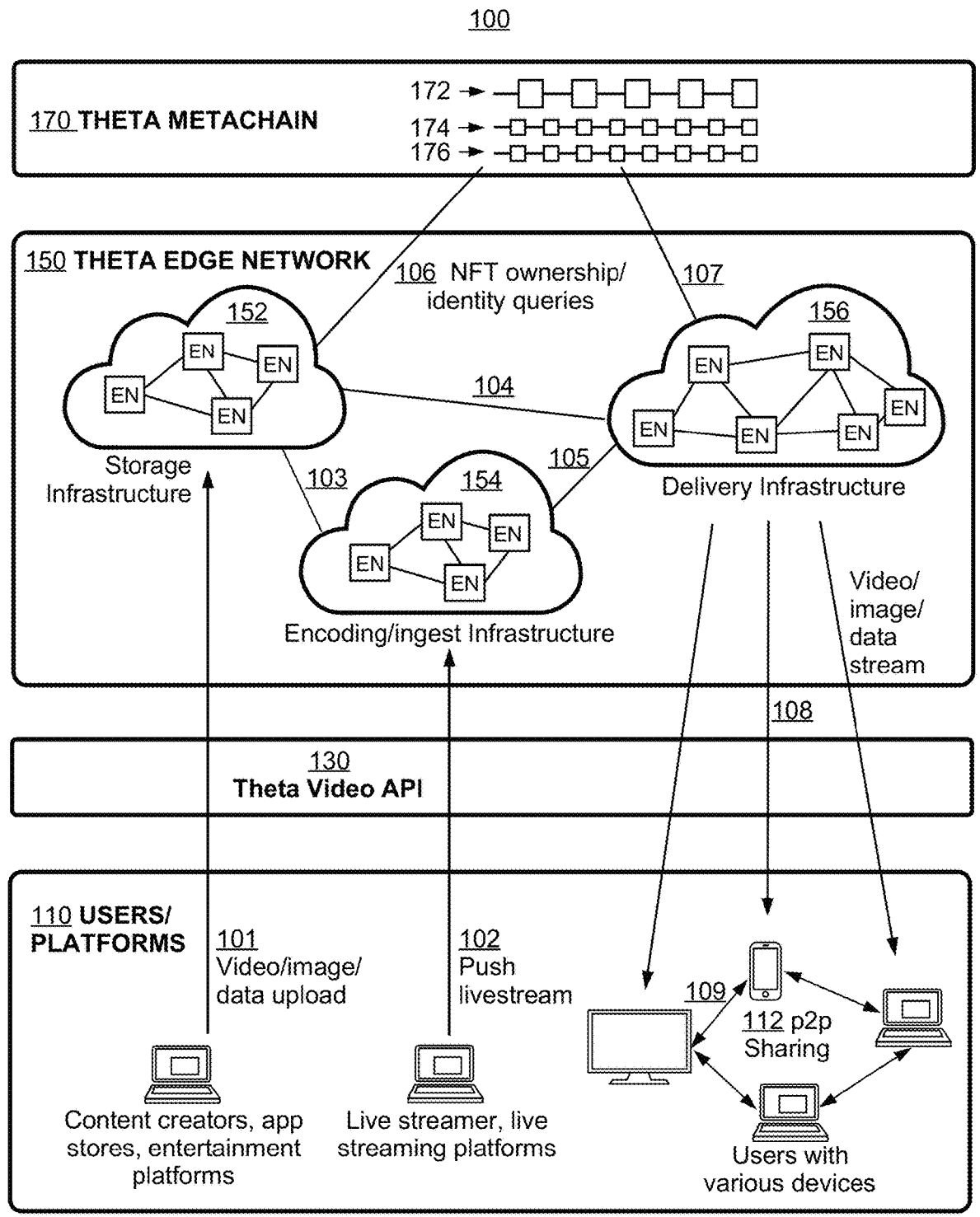
FIG. 1 is an illustrative architecture diagram of a video-focused edge computing, storage, and content-delivery infrastructure, according to one embodiment of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

THETA is a trademark name carrying embodiments of the present invention, and hence, the aforementioned trademark name may be interchangeably used in the specification and drawings to refer to the products/services offered by embodiments of the present invention. The term THETA may be used in this specification to describe the overall decentralized computing and storage network or platform, the public ledger system for rewarding resource sharing, as well as the company providing said network, platform, system, or services. With reference to the figures, embodiments of the present invention are now described in detail.

Introduction

Broadly, the present invention relates to methods and systems for a decentralized peer-to-peer network for storage, bandwidth, data, and/or computational resource sharing. More specifically, embodiments of the present invention are directed to a decentralized storage, streaming, and computing network or platform (hereafter the "THETA edge storage network", "THETA EdgeStore network", "THETA EdgeStore", "THETA edge computing platform", "THETA decentralized content delivery network", or "THETA edge network"). In some embodiments, peer-to-peer (P2P) storage and/or computational resource sharing is facilitated through smart contracts on a blockchain (hereafter the "THETA blockchain", or "THETA ledger system") maintained by a blockchain network (hereafter the "THETA blockchain network"). In the present disclosure, the term "THETA network" may refer to the THETA edge network, the THETA blockchain network, or combinations thereof, as would be clear to persons of ordinary skills in the art within the context of the detailed descriptions.

A peer-to-peer distributed network allows interconnected peer nodes to share resources with each other without the use of a centralized managing server or stable host. The THETA network, as described in issued U.S. Pat. No. 10,771,524 (Methods and Systems for a Decentralized Data Streaming and Delivery Network, incorporated by reference in its entirety herein), enables the sharing of bandwidth by edge cacher nodes, to cache and/or relay video and other data, in a network infrastructure that is scalable to millions of concurrent users through native THETA blockchain protocol-level support for cryptocurrency micropayments. The THETA network, as further described in pending U.S. patent application Ser. No. 17/302,398 (Edge Computing Platform Supported by Smart Contract Enabled Blockchain Network, incorporated by reference in its entirety herein), also enables central processing unit (CPU) and graphical processing unit (GPU) resource sharing, where task initiators and edge computing nodes support a wide range of distributed computational tasks with configurable task metadata and/or parameters, input/output data sizes and format, solution accuracy, precision, computation delay, and options for task batching and subdivision. In the present disclosure, an additional THETA EdgeStore framework is provided to enable edge nodes to distributively perform storage intensive tasks, such as video storage and live streaming, non-fungible token (NFT) storage, web data storage, and permanent data storage in general.

In various embodiments of the present invention, the THETA EdgeStore network is an append-only, content addressing, decentralized key/value storage network for the permanent web. The THETA EdgeStore network implements a unique technique called "flexible sharding," a probabilistic approach to distributed hash table (DHT) systems that provide lookup services in distributed systems. Sharding is a database partitioning technique that involves splitting or partitioning a logical dataset, and distributing the resulting data shards across multiple databases or multiple server devices. A DHT is a distributed technique over a decentralized peer-to-peer network, for providing a lookup service similar to a hash table. Key-value pairs are stored via the DHT, and participating peer nodes can efficiently locate or retrieve a value associated with a given key, with minimal key re-distributions as peer nodes enter or leave the decentralized network.

Traditional sharding is more or less a deterministic process. For example, the size of each data shard is fixed, and when the amount of data assigned to a shard grows beyond a certain limit, the shard is divided and the data re-shuffled. This architecture works well for a centralized database where the operator has full control over the system. However, in a decentralized storage network, this is difficult to implement. Instead, embodiments of the present invention examine a distance between a node ID and a data portion to determine if a given node should store this particular data portion. This sharding scheme is flexible as the distance can be thresholded differently for different nodes, for example, based on individual nodes' storage capacities. Each data shard is also probabilistic in nature as node IDs may be generated randomly.

Moreover, in some embodiments, THETA EdgeStore incorporates erasure code encoding to enhance data availability, by enabling data recovery from remaining nodes even when a large percentage of EdgeStore nodes have gone off-line. In some embodiments, a THETA EdgeStore node may not only store permanent data shards assigned to it, but also cache popular contents locally, to act as a decentralized content delivery network (dCDN).

Exemplary decentralized applications that may be built on top of THETA EdgeStore include, but are not limited to, the following:
  Permanent storage for digital assets or non-fungible tokens (NFTs), such as images and videos
  Data availability service for layer-2 blockchain scaling solutions, such as rollups
  dCDN for video, music, game patches, software updates, etc.
  Storage backend for general web3 decentralized applications (DApps), e.g., blogging sites, chat apps, decentralized app stores, decentralized Github repositories, etc.
  Storage for Metaverse digital assets, e.g., three-dimensional (3D) models of characters and buildings in virtual reality worlds
  Storage for training data sets for artificial intelligence (AI) algorithms, such as autonomous driving, protein folding, etc.

In short, the THETA decentralized EdgeStore platform expands and enhances peer-to-peer (P2P) distributed storage techniques to achieve high scalability and high resource availability. In what follows, a video-focused Web3 Edge Network Infrastructure is first presented, providing a high-level architecture with which an EdgeStore network may operate. Next, the EdgeStore network itself and flexible sharding techniques are described in detail.

Video-Focused Web3 Edge Network Infrastructure

FIG. 1 is an illustrative architecture diagram 100 of a video-focused, edge computing, storage, and content-delivery infrastructure, according to one embodiment of the present invention. In this example, video and media content are used as illustrative sample data that may be stored, processed, and delivered via the THETA Network. This exemplary architecture consists of four layers: Users/Platforms 110, THETA Video API 130, THETA Edge Network 150, and THETA Metachain 170.

In this illustrative example, Users/Platform 110 is the bottom layer, comprising video viewers, content creators, streamers, and media platform partners. These are users of the infrastructure.

THETA Video API 130 encapsulates the functionalities of the edge network into a developer-friendly programming interface. THETA DApp developers and users may interact with the edge computing infrastructure primarily through this interface.

THETA Edge Network 150 is a fully decentralized network for data storage, delivery, and edge computing, and comprises edge nodes run by the THETA community. In a video-focused implementation, edge nodes may provide various functionalities, including but not limited to storage, video encoding, live stream transcoding, and data delivery. In FIG. 1, edge nodes are grouped into three logical sub-networks 152, 154, and 156, for storage, encoding, and delivery respectively. This is for ease of illustration. In actual deployment, each individual edge node may be equipped with two or all three capabilities. In some embodiments, elite edge nodes with staked digital assets may be prioritized over regular edge nodes for encoding or storage job assignments.

In some embodiments, THETA Edge Network 150 is designed to support a hybrid configuration that combines cloud-based infrastructures and decentralized edge node networks. For example, THETA Edge Network 150 may work alongside on-demand cloud computing and/or storage platforms (not shown) such as AMAZON Web Services Simple Storage Service (AWS S3) or GOOGLE Cloud Platform (GCP) cloud storage, to achieve better robustness and fault tolerance when AWS or GCP are unable to achieve scale at optimum cost. As another example, a live stream transcoded by decentralized ingest network 154 may be pushed to delivery network 156 where edge nodes and a client-side p2p sharing network 112 may further assist the stream delivery, extending the coverage to locations that are far away from the content delivery network's (CDN) points of presence (PoP) data centers. Existing CDNs like AKAMAI and CLOUDFRONT may be used in conjunction with THETA Edge Network 150 to provide more thorough coverage for users in different regions of the world. This support for hybrid configurations offers flexibility and interoperability, and thus effectively combines the best of both worlds.

THETA Metachain 170 is the top layer, an interconnected network of blockchains, or a "chain of chains," an architecture that allows permissionless horizontal scaling to achieve potentially unlimited transactional throughput and sub-second block finalization time. More specifically, THETA Metachain 170 may comprise one main chain 172 and an unlimited number of subchains, such as 174 and 176, and each subchain may has its own consensus protocols customized for specific use cases. Main chain 172 refers to the THETA Mainnet. Developers may quickly launch a subchain such as 174 and plug it into the main chain, for example by using a ready-to-use Software Development Kit (SDK). Each subchain may execute transactions independently, thus providing a viable path to infinitely scale the processing capacity of the metachain. This process of creating a subchain is permissionless, and anyone can register and launch a subchain. The subchain SDK may further implement a built-in interchain messaging channel to connect the subchains and the main chain. For example, each subchain node may run inside a container along with a main chain node. Through the main chain node's Remote Procedure Call (RPC) interface, a subchain node may obtain main chain information in real time. Furthermore, through Metachain 170's RPC interface, edge network 150 may interact with smart contracts deployed on the metachain.

Following are some illustrative examples of potential Web3 use case for the THETA network infrastructure shown in FIG. 1:

Example 1—Video Delivery: A video content creator may upload a clip to storage infrastructure 152 through a THETA Video API dashboard (step 101). In this example, storage infrastructure 152 could either be a decentralized storage network like THETA EdgeStore or a cloud storage like GCP cloud. Whenever the THETA encoding/ingest network 154 detects a new upload, it may assign the transcoding job to one or more edge nodes, which in turn download the clip and transcode it into a stream with multiple bitrates/resolutions (step 103). Next, the edge nodes may upload the stream to the delivery infrastructure 156, which may comprise edge nodes and potentially existing CDNs (step 105), and return a playback URL to the original video content creator via the THETA Video API dashboard. The content creator may embed the URL on his/her website. Whenever a viewer watches the video, the delivery network may find the best possible routes to deliver the stream to the end viewer (steps 108 and 109).

Example 2—Non-Fungible Token (NET) Digital Asset Hosting: An NFT creator may upload an image to the storage infrastructure 152 through a THETA Video API dashboard, and pay a crypto asset such as TFUEL for the THETA EdgeStore decentralized storage backend to host it permanently (step 101). Next, delivery network 156 may download the image and replicate it across the network (step 104) to shorten the access latency for end users (steps 108 and 109). TFUEL paid by the uploader may be split by edge nodes that store the image file.

Example 3—Paid Live Stream Secured by NFT-Based Digital Rights Management (DRM): A live streamer may put up a stream that is only viewable by paid users. This may be achieved by leveraging THETA's NFT-based DRM technology. First, the streamer may issue a subscription NFT. When a stream is created on the THETA Video API dashboard, the streamer may specify that only users with a particular NFT collection in his/her crypto wallet can watch the stream. Next, as the streamer pushes the stream into the ingest network (step 102), the ingest nodes may encrypt the stream and relay the encrypted stream to the delivery network (step 105). When users watch the stream on their devices, they may first connect their crypto wallet with the video player. The delivery network may query THETA Metachain 170 to check if a user's wallet indeed owns a subscription NFT (step 107). If NFT ownership is confirmed, the delivery network sends the user's device a decryption key (step 108), with which the user can decrypt and access the live stream.

Example 4—Generic Website Hosting: Although the THETA infrastructure focuses on video delivery capability in FIG. 1, it can host generic files and deliver generic data streams as well. For this use case, a website creator may upload static files of the website to storage infrastructure 152 through the THETA Video API dashboard (step 101), and pays for storage cost in a crypto asset such as TFUEL. The files may then be replicated throughout the network to reduce download latency (step 104). Finally, users can access the website through THETA edge delivery network 156 (step 108).

EdgeStore System Overview

Figure 2:
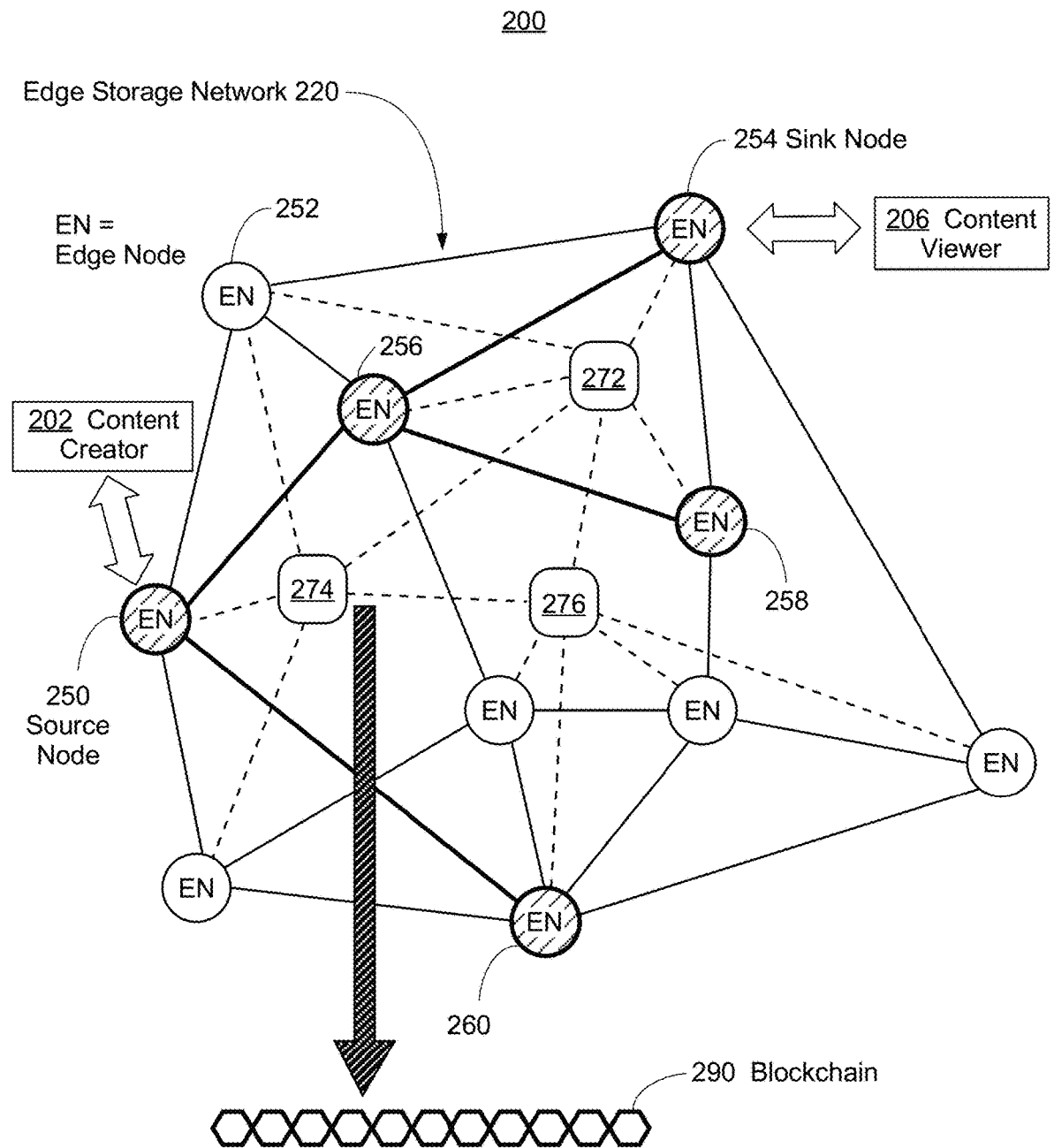
FIG. 2 shows a high-level diagram of a dual network comprising a decentralized edge network and a blockchain network, according to one embodiment of the present invention.

FIG. 2 is an illustrative network diagram 200 showing a decentralized edge storage network as supported by a smart contract-enabled blockchain, according to one embodiment of the present invention. This THETA network shown in FIG. 2 is a "dual network" consisting of two complementary subsystems, a THETA Edge Storage or EdgeStore Network 220 made of edge nodes (labeled as "EN" in FIG. 2), and a THETA Blockchain network comprising blockchain nodes such as 272, 274, and 276, to maintain a THETA blockchain 290. THETA Edge Storage Network 220, as discussed with reference to THETA Edge Network 150 in FIG. 1, is responsible for the storage and delivery of media assets such as images and videos. THETA blockchain 290, as discussed with reference to THETA Metachain 170 in FIG. 1, provides payment, rewards, and smart contract capabilities.

In this illustrative diagram, an edge node 250 in edge storage network 220 may function as a source node and upload a media file from a content creator 202. Content creator or distributor 202 may generate or provide a data file such as an NFT, an image, a video, a text file, an audio file, or any other suitable content for storage in the P2P edge storage network 220. In various aspects, the content creator or distributor 202 may include a user, a group of users, a software application, combinations thereof and/or the like. As further described herein, content creator 202 may be motivated to create and/or upload content to the P2P storage network 220 at least to obtain monetary reward, for example, in the form of cryptocurrency incentives.

A data file uploaded by content creator 202 may be shared with one or more content viewers such as 206 using the mechanisms described herein. A sink node 254 may download the desired data file from the edge storage network 220 for use or view by content viewer 206. Content viewer 206 may be any suitable user operated devices that are connected to sink node 254 in the P2P storage network 220, including, but not limited to, laptops, cell phones, tablets, and the like.

During file upload to the edge storage network as described herein, when a single edge node cannot handle the amount of data or the query load for a data file, the data file from content creator 202 may be divided or partitioned into multiple portions, each stored on one or more edge storage nodes, such as 256, 258 and 260 of the P2P edge storage network 220.

In traditional databases, data may be partitioned vertically or horizontally. Vertical partitioning refers to splitting up data by related fields. Such fields may include properties of some common object, commonly accessed characteristics of files that are accessible via queries, and/or properties that are accessed at similar frequencies or by user devices with similar permissions. For example, a relational database table may be vertically partitioned into smaller tables each with fewer columns. Horizontal partitioning partitions data into subsets all with the same schema. For example, a relational database table may be grouped or partitioned by rows and stored on separate servers or nodes on a network. A database shard often refers to a horizontal partition of data in a database or search engine. However, in the present disclosure, a data shard refers to any fraction or portion of a source data file, obtained using any suitable data division or partition techniques. For example, an image file may be partitioned or sharded by size, spatial sampling, image layers, color components, or any other techniques appropriate for the source file. Similarly, a video file may be partitioned or sharded by spatial and/or temporal sampling, color components, or any other techniques appropriate for the source file.

In some embodiments, the disclosed systems may use algorithmic sharding, dynamic sharding, or a combination of the two. Algorithmic sharding may be used to determine to which shard a piece of data is assigned, based on a function of the data's key. For example, when storing key-value data mapping URLs to hypertext markup language (HTML), the disclosed systems may range partition by splitting up key-values according to the first letter of the URL. For instance, all URLs starting with "A" may be mapped on a first shard sent to a first edge node, "B" on the second edge node, and so on. Dynamic sharding may be used to determine the location of data and to store that location in a lookup table.

During file download from the edge storage network as described herein, a sink node 254 may obtain portions of a desired data file from the edge storage nodes in the P2P storage network 220 and reconstruct the data file for presentation to a user at the content viewer 206. Further details are provided in the example flow of operations diagrams and description in association with FIGS. 4-8, and as summarized below.

As THETA edge storage network 220 is fully decentralized and without any centralized control or hierarchical organization, after data shards are transmitted and stored in separate peer edge nodes, a core operation is the efficient location and lookup of data in the dynamically changing P2P system as edge nodes join or leave the network. In various embodiments, a distributed hash table (DHT) may be employed.

A DHT is a distributed technique over a decentralized P2P network, for providing a lookup service similar to a hash table. Key-value pairs are stored via the DHT, and participating peer nodes can efficiently locate or retrieve a value associated with a given key, with minimal key re-distributions as peer nodes enter or leave the decentralized network. More specifically, keys are unique identifiers which map to particular values, which in turn are the data files to be stored. An abstract keyspace is first established, and a keyspace partitioning scheme splits ownership of this keyspace among participating peer nodes. A DHT stores key-value pairs by assigning keys to different nodes of the network; each node stores the values for all the keys for which it is engaged with. An overlay network connects the nodes, and enables each node to find the owner node of any given key in the keyspace. In one example, a given data file with a given filename may be indexed in the DHT by hashing the filename into the keyspace to generate a key. The key and the data file are then sent to any node participating in the DHT, and propagated from node to node through the overlay network until it reaches a storage node assigned with the key, as specified by the keyspace partitioning. The storage node then stores the key and the data. Another node that wishes to retrieve the original data file may hash the same filename to produce the same key, and find the data associated with this key by sending a request message that is again propagated through the overlay network until it reaches the assigned storage node, which in turn reply with the stored data file.

As will be discussed with reference to FIGS. 4-6 in more detail later, embodiments of the present invention utilize a unique "flexible sharding" technique that is a probabilistic extension of DHT protocols such as Chord. Chord is a scalable P2P lookup protocol. Given a key, Chord uses consistent hashing to map the key onto a node. Consistent hashing employs a distance measure $d(k_1, k_2)$ that is unrelated to geographical distance or network latency. Each node and key is assigned an identifier respectively. A node's identifier may be generated by hashing the node's IP address, while a key identifier may be generated by hashing the key itself. Identifiers are ordered on an identifier circle or ring. A key k is assigned to the first node whose identifier is equal to or follows the identifier of k in the identifier space. That is, assume a node has an identifier $i_x$. For two adjacent node identifiers $i_1$ and $i_2$ positioned clockwise on the identifier ring, the node with identifier is owns the keys that have identifiers that fall between $i_1$ and $i_2$.

In embodiments of the present invention, a distance may be defined between a node and a data portion, and each data portion may be assigned a different priority by the node, based on its distance to the node. Thus, a distance threshold may be defined for each node, and a file portion whose distance to the node is below the threshold may be stored at the node. In this way, each node only stores a part of an entire data file, and the distance threshold may be configurable and flexible, depending on each node's storage capacity. In some embodiments, the distance is measured between hashes of node IDs and hashes of file portions. Since node IDs may be generated randomly, the resulting data sharding, or partitioning and assignment process, is probabilistic in nature.

In some aspects, some edge nodes of the network (e.g., nodes that are geographically distanced from at least a portion of the other nodes) may contribute less storage and some may contribute more storage, based on storage availability and resource usage on the overall network. Accordingly, the disclosed systems may direct portions of a file to be stored to different nodes based on such considerations in a dynamic manner, and may further use machine learning techniques based on various input parameters such as node location, availability, and previous usage history.

In some embodiments, the disclosed systems may maintain data integrity and high availability across the various nodes of the decentralized storage network over a wide area network spanning different geographical domains, for example, by using any suitable redundancy technique, such as those based on erasure coding techniques like Reed-Solomon. This allows the system to recreate an entire block of data even if some nodes are temporarily unavailable (e.g., due to loss of network connectivity, the machine being powered off or a hardware failure). In some examples, the disclosed systems may use a simpler, less computationally intensive but more storage-capacity intensive forms of redundancy via duplicate copies of blocks of data and/or files.

In various embodiments, the disclosed systems may store a variety of data types. Non-limiting examples of data types that can be stored include documents such as nested collections of javascript object notation (JSON) documents, key-value files such as key-value pairs, relational data such as tables of rows with an explicit schema, binary objects such as arbitrary binary blobs, file systems including directories of files, graphs including nodes with edges, messages including groups of key-value pairs, time-series data including data ordered by timestamp, text data such as free-form text or logs, combinations of the same and/or the like.

In some embodiments, the distribution of a file to peer storage nodes may be based on a variety of parameters including, but not limited to, general network traffic patterns, node availability, node storage and/or processing capability, a type of file, a desired file longevity or lifespan, a network bandwidth, a predetermined rule-based algorithm (e.g., for tiered storage), a machine-learning based optimization of content distribution using any suitable machine learning algorithm (e.g., neural network), and so on. Moreover, peer storage nodes of the network receive and store one or more portions or shards of a file. Upon a user making a request to retrieve (e.g., download) the file (e.g., an MP4 file), the file may be assembled from the shards from the various nodes of the network into the original file. The reassembly of the file may also be performed based on a variety of parameters including, but not limited to, general network traffic patterns, node availability, node storage and/or processing capability, a type of file, a network bandwidth, a predetermined rule-based algorithm, a machine-learning based optimization of content distribution using any suitable machine learning algorithm, and so on.

To facilitate and incentivize peer edge nodes in edge storage network 220 to participate in decentralized storage, the THETA blockchain network shown in FIG. 2 may provide native protocol level support for reward pools and smart contracts. A blockchain such as 290 includes a list of public transaction records, or bocks, linked through cryptography, and is typically managed by a blockchain peer-to-peer network, as illustrated by blockchain nodes 272, 274, and 276. Each edge node in the THETA EdgeStore network 220 is connected to at least one blockchain node in FIG. 2. In some embodiments, edge storage nodes may function as blockchain nodes and may participate in transaction verification, block assembly, and smart contract execution as well. In some embodiments, edge storage nodes may be rewarded for being up and running within the THETA network. While some payment systems may use a central authority to verify and clear transactions to maintain trust, a blockchain ledger can achieve global, decentralized consensus without such a central authority. The THETA main blockchain uses a Proof-of-Stake (PoS) distributed consensus approach, where a blockchain node may mine or validate a block according to various combinations of random selection, wealth and/or age (i.e., the "stake"). For example, a stake may be a fixed amount of cryptocurrency funds that is committed to the blockchain by a miner in order to participate in block creation and validation. The more stake a miner commits, the more mining power it may have. In various embodiments, other types of block consensus mechanisms such as Proof-of-Work, Proof-of-Engagement, etc. may be used, especially in THETA subchains as discussed with reference to FIG. 1. Furthermore, smart contracts are immutable computer programs executed and run deterministically on blockchain nodes. Once deployed, a smart contract can be executed but cannot be changed. Each edge node in the THETA EdgeStore network may access smart contracts deployed on blockchain 290 to participate in distributed storage as disclosed herein.

Figure 3:
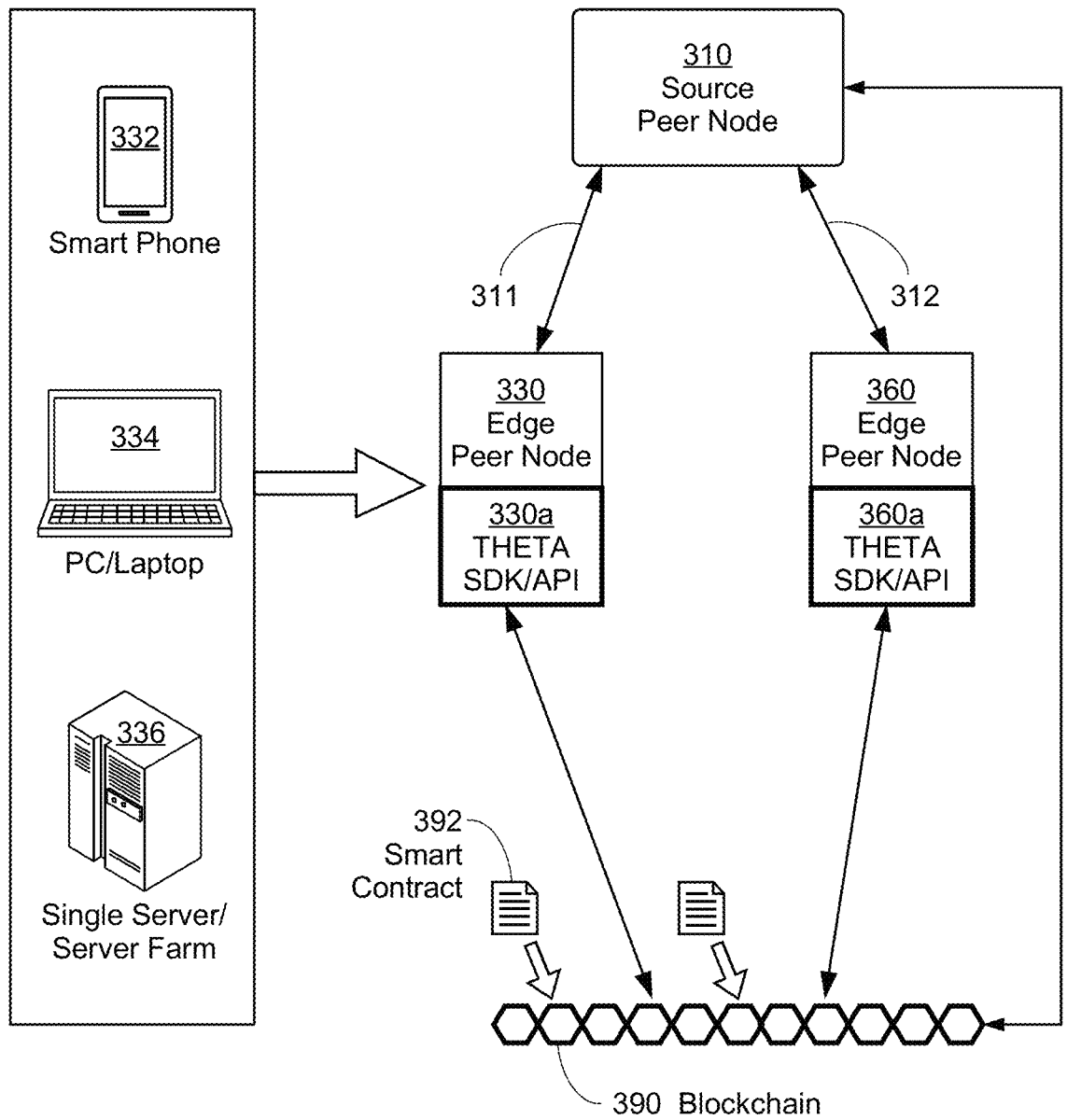
FIG. 3 is an illustrative architecture diagram showing part of a decentralized edge storage platform, according to one embodiment of the present invention.

FIG. 3 is an illustrative network diagram 300 showing an incentivized, decentralized THETA EdgeStore platform, according to one embodiment of the present invention. In this illustrative example, a source peer edge node 310 is connected to edge storage nodes 330 and 360 through P2P connections 311 and 312 respectively. In one exemplary embodiment, source edge node 310 may be a user node, such as when a content creator relies on another peer for the storage, transcoding, or caching of video data. In another exemplary embodiment, source edge node 310 may be an institutional server cluster from content-hosting and distribution networks.

In various embodiments, each component or node within the THETA network may be implemented as different types of applications or modules, such as stand-alone edge storage clients, WebApps, SDKs, and the like. For example, edge node 330 may be implemented as a dedicated software module that runs on any suitable device including, but not limited to, mobile computing devices such as tablets or smart phones 332, personal computers or desktops 334, game consoles, and server machines 336. Other examples of suitable computing entities are provided with reference to FIGS. 15 and 16. Edge node 330 may offer a portion or all its local idle storage capacity for sharing, with the actual amount of storage resource configured dynamically.

In some embodiments, each of edge nodes 330 and 360 may implement an end-user software using a THETA Software Development Kit (SDK) or Application Programming Interface (API) such as 330a and 360a, so that an edge storage node may utilize pre-existing software or computing environments. That is, the THETA SDK may be integrated into a third-party application or device so that a task may be solved through the third-party application when necessary. An SDK is a set of software development tools or programming packages for creating applications for a specific platform. An SDK may be compiled as part of the developed application to provide dedicated interfaces and functionalities. Alternatively, an SDK may be an individually compiled module, incorporable into an existing application or computing environment as a plug-in, add-on, or extension in order to add specific features to the application without accessing its source code.

Edge storage nodes may utilize any peer discovery methods to self-organize into semi-randomly connected networks based on node specifications, bandwidth availability and cost, network distance/geo-distance, and/or other factors. For example, each edge node such as 330 and 360 in FIG. 3 may have one or more associated availability scores, indicating its storage capacity. Each edge node such as 330 in FIG. 3 may have one or more additional scores as well, indicating its computational capacity for video encoding and ingestion, load, priority, urgency, delay requirement, and similar characteristics. Such scores may be used for node matching, allocation, and assignment. In some embodiments, such scores may be stored in local copies of distributed hash tables. In some embodiments, such scores may be stored in a blockchain 390, as peer edge nodes registered via a smart contract on blockchain 390 to participate in decentralized edge storage.

To incentivize resource sharing, each edge node 310, 330 and 360 in FIG. 3 may have direct access to THETA blockchain 390 that hosts one or more smart contracts such as 392. A smart contract is a decentralized application stored and run on a blockchain. When a transaction has a smart contract address as a destination, the smart contract is executed and a function as specified by the transaction is called. In embodiments of the present invention, one or more smart contracts deployed on blockchain 390 may be invoked, called, or triggered to distribute token awards from a reward pool to edge nodes for providing time-limited or permanent storage.

In some embodiments, blockchain 390 is a dedicated THETA subchain for the storage network. When a user uploads a file, he or she may pay for a certain amount of a crypto asset (e.g., TFUEL), which may be stored by a "reward pool" smart contract. As the subchain produces a new block, a random number R may be generated. Based on R, one or more file portions may be randomly selected. Storage nodes that store a selected portion may post a hash HASH (file portion||R) to a smart contract on the subchain. The smart contract may then compare the submitted hashes. If there is a hash H that reaches a majority among the storage nodes that posted their hashes, then those nodes that posted H may be rewarded with a certain amount of crypto asset via the reward pool contract. Assuming the storage nodes have honest majority, then the above-described incentive mechanism would be able to motivate the nodes to store file portions assigned to them, based on either distance metrics as disclosed herein, or by a "shard management" smart contract.

An alternative to the above "hash voting" scheme is to use more advanced crypto techniques such as proof-of-storage, proof-of-retrievability, etc. to prove that a storage node actually possesses a file portion.

Flexible Sharding

As discussed previously, embodiments of the present invention utilizes a unique "flexible sharding" technique that is a probabilistic extension of distributed hash table (DHT) protocols such as Chord. Chord is a scalable P2P lookup protocol. Given a key, Chord uses consistent hashing to map the key onto a node. Consistent hashing employs a distance measure $d(k_1, k_2)$. Each node and key is assigned an identifier respectively. A node's identifier may be generated by hashing the node's IP address, while a key identifier may be generated by hashing the key itself. Identifiers are ordered on an identifier circle or ring. A key k is assigned to the first node whose identifier is equal to or follows the identifier of k in the identifier space. That is, assume a node has an identifier $i_x$. For two adjacent node identifiers $i_1$ and $i_2$ positioned clockwise on the identifier ring, the node with identifier $i_2$ owns the keys that have identifiers that fall between $i_1$ and $i_2$.

Figure 4:
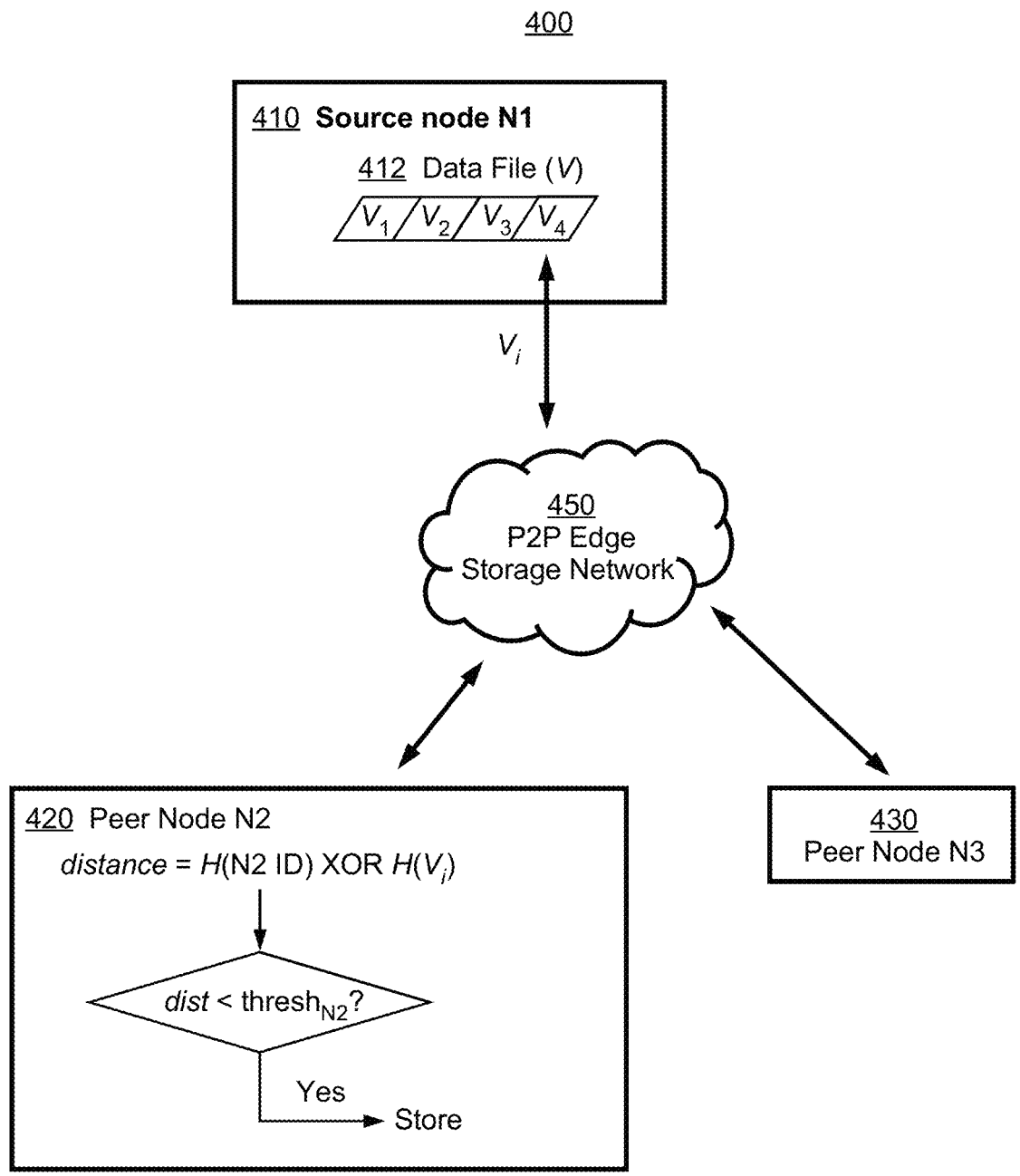
FIG. 4 shows an illustrative example of flexible sharding for decentralized storage, according to one embodiment of the present invention.

FIG. 4 shows an illustrative example 400 of flexible sharding for decentralized storage, according to one embodiment of the present invention. In this embodiment, a distance is defined between a peer storage node and a data portion, and each data portion may be assigned a different priority by the peer storage node, based on its distance to the peer storage node. Thus, a distance threshold may be defined for each peer storage node, and a file portion whose distance to the node is below the threshold may be stored at the node. In this way, each node only stores a part of an entire data file, and the distance threshold may be configurable and flexible, depending on each node's storage capacity. In some embodiments, the distance is measured between hashes of node IDs and hashes of file portions. Since node IDs may be generated randomly, the resulting data sharding, or partitioning and assignment process, is probabilistic in nature.

More specifically, a P2P edge storage network 450 in FIG. 4 comprises peer edge nodes 410, 420, and 430. Here peer node 410 is a source node for data file upload. For example, peer node 410 may be a content creator that generates a file such as an NFT, an image, a video, a text file, an audio file, or any other suitable content. In various embodiments, the content creator may be a user, a group of users, a software application, combinations thereof and/or the like. Peer nodes 420 and 430 are individual edge storage nodes.

In this illustrative example, a data file V 412 is to be uploaded into the decentralized edge storage network. Data file 412 is partitioned or sharded into a plurality of portions $V_1$ to $V_4$; each may or may not have the same size. Each of the storage nodes 420 and 430 may receive some or all of the portions through the following flexible sharding process.

First, each portion of the file may be hashed using a hash function H, for example into a 32-byte string or a 160-bit string, which serves as an "identifier" $H(V_i)$ for that file portion $V_i$. Similarly, a node identifier may be computed using the same hash function based on a node ID.

A distance metric may be defined between a node identifier and a file portion identifier, which in this example are the hash of a node ID and the hash of the file portion respectively. That is, define a distance(node Nj, file portion $V_i$)=hash(node Nj ID) XOR hash(file portion $V_i$)=H(node Nj ID) XOR H($V_i$). This distance may be used to determine the likelihood that node Nj would store file portion $V_i$, whereas a smaller distance may translate to a higher likelihood. That is, an edge storage node N2 420 may give different priority to different file portions $V_1$, $V_2$, $V_3$, and $V_4$. The lower the distance between edge storage node N2 420 and a file portion $V_i$, the higher priority node 420 may give to file portion $V_i$, and the more likely node 420 may store file portion $V_i$.

In the implementation shown in FIG. 4, edge storage node N2 420 computes and compares the above distance measure to a node-specific "distance threshold" $thresh_{N2}$, then only stores file portions whose distances to N2 is below the threshold $thresh_{N2}$. As a result, each edge storage node only stores a part of the entire data set, in the same spirit of traditional data sharding.

In some embodiments, each node ID may be generated randomly, thus bringing about a probabilistic nature to each data shard. For example, a node ID may be an IP address, or a crypto wallet address, such as a THETA wallet address associated with the peer storage node (e.g., 0x2e833968e5bb786ae419c4d13189fb081cc43bab).

In different embodiments, multiple strategies may be deployed by source node 410 to locate edge storage nodes 420 and/or 430. In the illustrative implementation shown in FIG. 4, source node 410 may gossip the portions $V_i$ throughout the network. Each receiving node such as peer node 420 may perform the distance computation and comparisons as described above against its own ID, and decide whether to store the received file portion. Again, when this distance is below a configurable threshold, the edge storage node may store the file portion locally. Note in the present disclosure, the phrase "below a threshold" indicates a general comparison operation. It would be understood by persons of ordinary in the art that this general comparison operation may vary in different implementations. For example, the distance measure and comparison criteria may be setup in other ways so that the decision to store a file portion is made when the distance measure is higher than rather than lower than a given threshold. It would also be understood by persons of ordinary in the art that "below a threshold" may include the specific case where the distance is equal to the threshold, again in specific implementations of the systems disclosed herein.

The aforementioned configurable threshold may be different for different nodes, and may depend on each node's storage capacity. The storage capacity of a peer storage node refers to the amount of storage available for use by the decentralized storage system disclosed herein. In some embodiments, as a peer node stores more data, its storage capacity decreases and its corresponding distance threshold may change accordingly. In some embodiments, such changes in distance thresholds may occur as a limited number of discrete tiers. In a first example, a peer storage node may choose to have two different thresholds, the first corresponding to its storage capacity upon initially joining the network, and the second corresponding to its storage capacity when it is almost full, such as when it is 80% full. That is, the peer storage node may continue to store file portions with the first threshold, until it is 80% full, upon which point it would only store file portions with a very small distance, or very high priority. In a second example, a peer storage node may choose to update its distance threshold every time it stores an additional file portion.

In a more specific example, assume a replication factor of 4 without erasure coding. If each file portion is 1 megabyte (MB) in size, and the computed file portion identifier is a 32-bit integer, then the maximum storage capacity of a decentralized storage network is $2^{32}*1$ MB=4.29 petabyte (PB). For a node with 100 gigabyte (GB) storage capacity, if hash(node ID) XOR hash (file portion)<4*(100 GB/4.29 PB)*$2^{32}$=400464.0=0x61c50, the node may decide to store the file portion.

In another implementation, source node 410 may gossip the identifiers of file portions through the decentralized network, and a peer storage node may check its distance from each file portion whose identifier has been received, and notify the source node to transmit the file portion, if the distance metric meets the peer storage node's thresholding criterion.

In another implementation, source node 410 may gossip file portions to only its neighbors that have a small distance to that portion. That is, source node 410 may send $V_i$ to its neighbors within a geographical or logical distance. A neighboring node N may in turn compare $H(V_i)$ XOR H(node N ID) to its own threshold. If the computed distance is below its threshold, the neighboring node N stores the file portion $V_i$. Alternatively, source node 410 may send $H(V_i)$ to its neighbors. A neighboring node N may in turn compare $H(V_i)$ XOR H(node N ID) to its own threshold. If the computed distance is below its threshold, the neighboring node N sends a message to source node 410 to transmit the file portion $V_i$ to this neighbor.

In yet another implementation, a decentralized ledger or a blockchain may be used to manage edge storage node registration. That is, each node in the network could query the blockchain, knows the IDs of all available nodes, and may choose to send file portions to nodes that would likely store the file portions.

Figure 5:
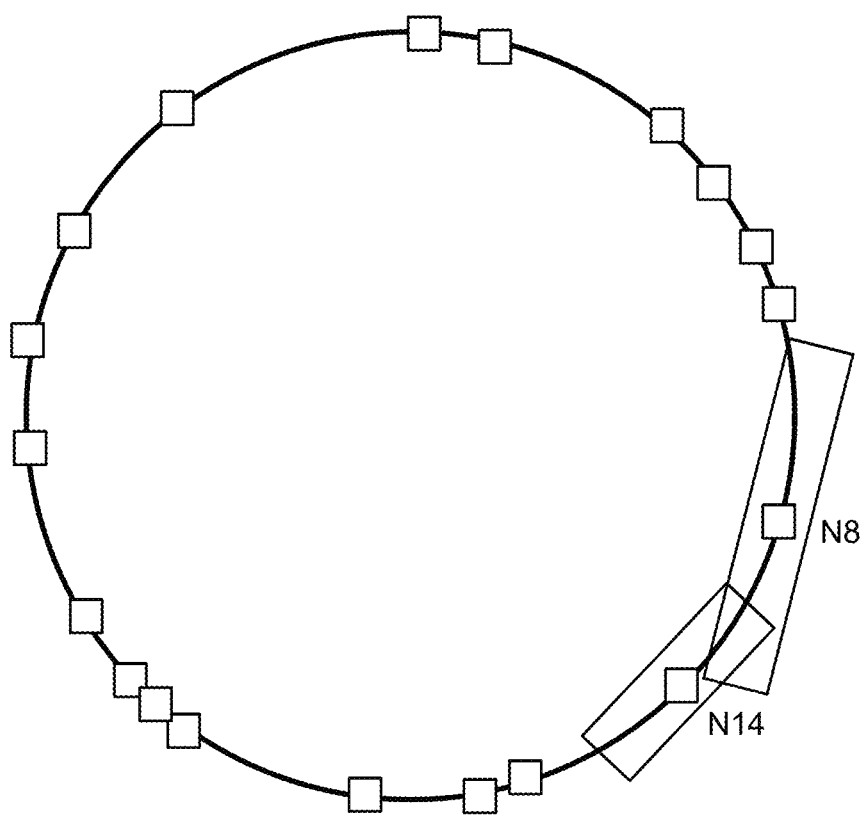
FIG. 5 shows an exemplary diagram of peer storage nodes randomly distributed on an identifier ring, according to one embodiment of the present invention.

FIG. 5 shows an exemplary diagram 500 of peer storage nodes randomly distributed on an identifier ring, according to one embodiment of the present invention. As discussed, in some embodiments, node identifiers may be generated from node IDs using a hash function. Recall that the ID of each node may be generated randomly, for example, as THETA wallet addresses. When the hash of storage node IDs and file portions are drawn around an identifier ring, the entire hash string space or keyspace from 0x000 . . . 000 to 0xfff . . . fff is mapped to randomly distributed points on the circle, giving rise to a probabilistic nature of the flexible sharding scheme disclosed herein. In FIG. 5, each small square represents an identifier for a storage node. The two rectangles represent "storage neighborhoods" of two of the nodes N8 and N14. Here "storage neighborhood" of a node consists of identifier or hash strings whose distance to the node is smaller than the "distance threshold" of this node. Any two "storage neighborhoods" may have different sizes as the two nodes might have different storage capacities.

By design, the "storage neighborhoods" may overlap. Overlapping neighborhoods provide redundancy for the files stored by the network. Thus, as more storage nodes join the network, the storage network may become more robust and reliable.

Figure 6:
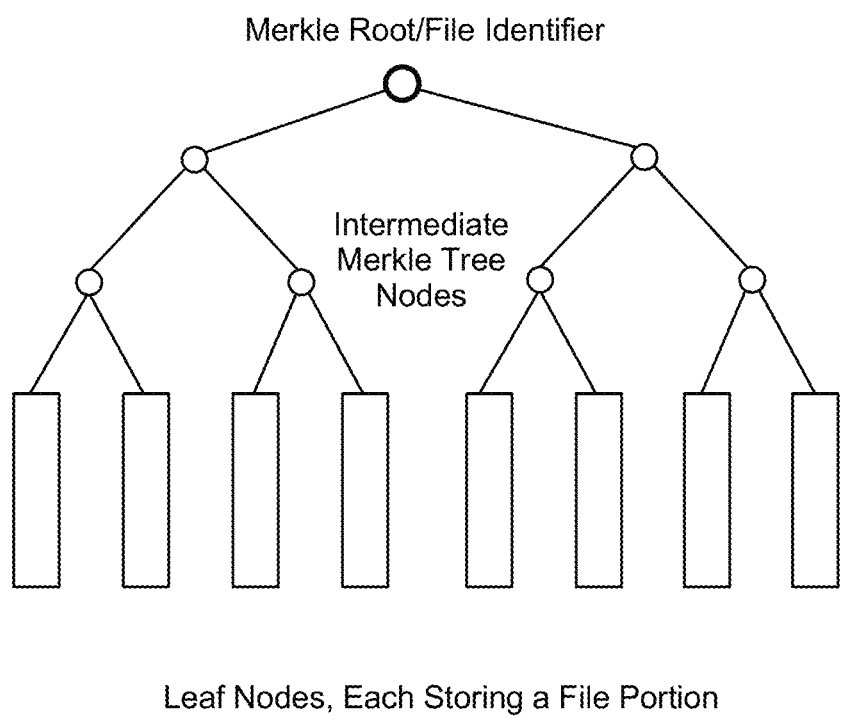
FIG. 6 shows a diagram for an exemplary Merkle-tree based file storage structure, according to one embodiment of the present invention.

FIG. 6 shows a diagram 600 for an exemplary Merkle-tree based file storage structure, according to one embodiment of the present invention. Again, a file may be divided into many small portions by a source node. A Merkle tree or other vector commitment schemes such Kate Polynomial commitment, or Verkle tree may be used to store the portions, where each portion is stored by at a leaf node. The root of the Merkle tree or the chosen vector commitment scheme may be used as an identifier for the file. Intermediate nodes of the Merkle tree may also be stored as one or multiple portions by the storage nodes, while the root (i.e., the identifier of the file) may be stored in a smart contract. To lookup a file, a user may query the storage network with the file identifier. With the identifier, the network may first perform a DHT lookup to determine the storage location of intermediate nodes of the Merkle tree, from which the identifier or hash of each file portion may be recovered. With the hashes, DHT lookup may be performed again to retrieve all the file portions to assemble the original file.

In various embodiments, the above process may be file-type agnostic. A folder that contains multiple subfolders and files may be processed just as a data file, with a preprocessing step to concatenate all the subfolders and files into a file. Hence, images, videos, HTTP Live streams (HLS), and web apps or dAPPs may all be processed and stored in the same way.

Exemplary Flow of Operations

Figure 7:
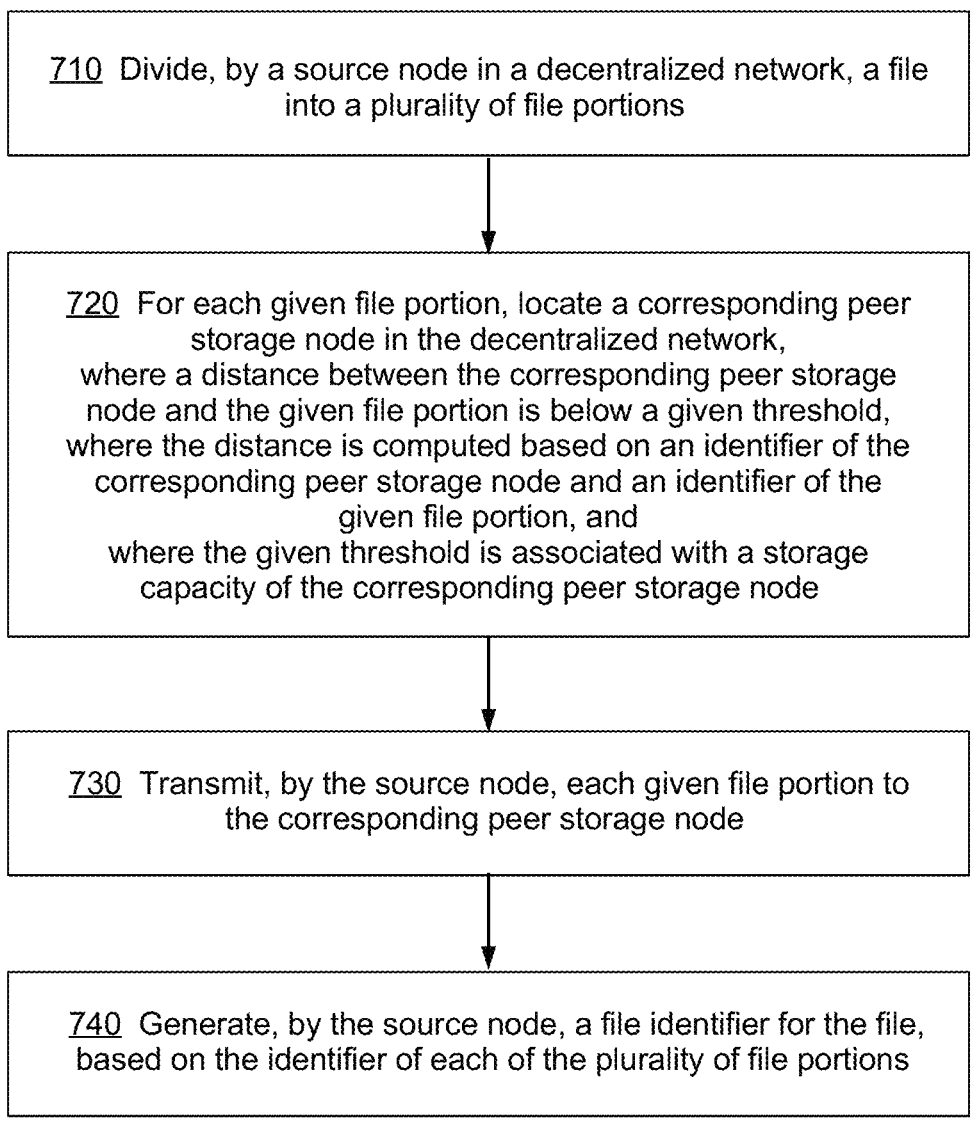
FIG. 7 shows an illustrative flow diagram for the disclosed systems providing exemplary file upload operations by a source edge node, according to one embodiment of the present invention.

FIG. 7 shows an illustrative flow diagram for the disclosed systems providing exemplary file upload operations by a source edge node, according to one embodiment of the present invention. At a processing step 710, a file is divided by the source node into a plurality of file portions. At step 720, for each given file portion, a corresponding peer storage node is located in the decentralized network, where a distance between the corresponding peer storage node and the given file portion is below a given threshold, where the distance is computed based on an identifier of the corresponding peer storage node and an identifier of the given file portion, and where the given threshold is associated with a storage capacity of the corresponding peer storage node. At step 730, each given file portion is transmitted by the source node to the file portion's corresponding peer storage node. At step 740, the source node generates a file identifier, based on the identifier of each of the plurality of file portions.

Figure 8:
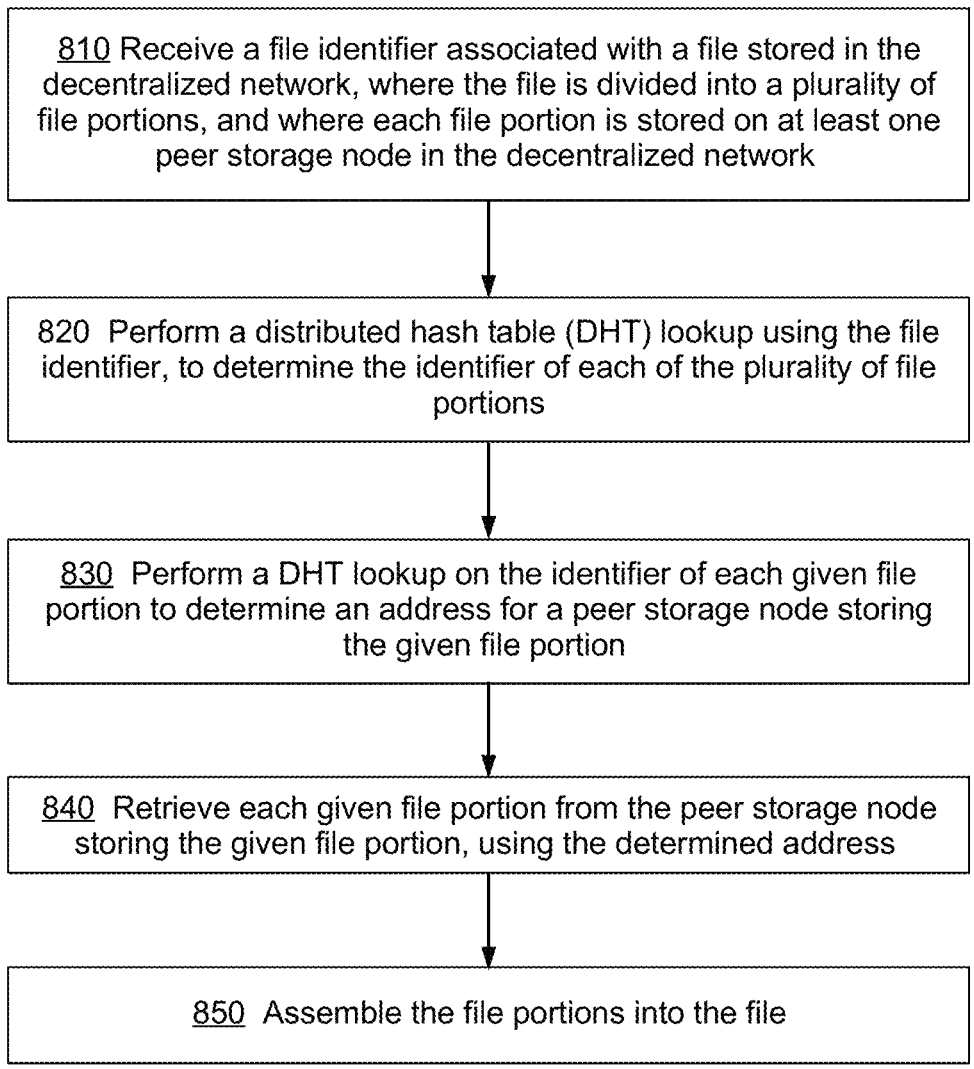
FIG. 8 shows an illustrative flow diagram for the disclosed systems providing exemplary file download operations by a user edge node, according to one embodiment of the present invention.

FIG. 8 shows an illustrative flow diagram for the disclosed systems providing exemplary file download operations by a user edge node, according to one embodiment of the present invention. At step 810, a file identifier associated with a file stored in the decentralized network is received or retrieved by a user node, where the file is divided into a plurality of file portions, and where each file portion is stored on at least one peer storage node in the decentralized network. At step 820, a distributed hash table (DHT) lookup is performed using the file identifier, to determine the identifier or hash of each of the plurality of file portions. At step 830, a DHT lookup is performed on the identifier of each given file portion, to determine an address for a peer storage node storing the given file portion. At step 840, each given file portion is retrieved from the peer storage node storing the given file portion, using the determined address. At step 850, the retrieved file portions are assembled into the original file.

Exemplary Use Cases

The following are illustrative use cases of the present invention and are not intended to be limiting examples.

Figure 9:
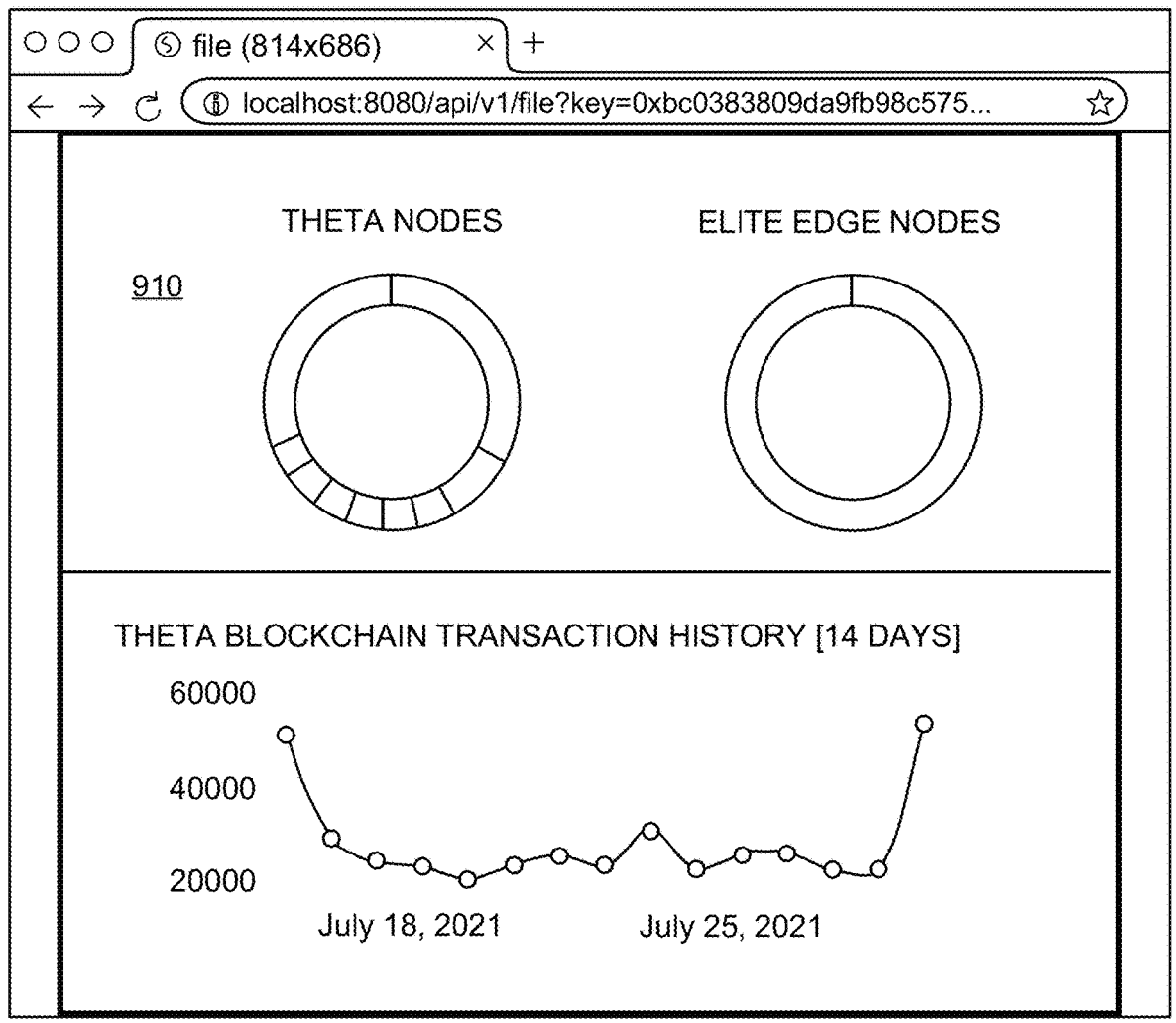
FIG. 9 shows an illustrative screenshot demonstrating a single node private network for image storage and serving, according to one embodiment of the present invention.

FIG. 9 shows an illustrative screenshot 900 demonstrating a single node private network for image storage and serving, according to one embodiment of the present invention. This example demonstrates how the disclosed systems may enable the upload/retrieval of an image file 910 to/from a local single-node EdgeStore Network.

In order to upload and retrieve image file 910, the disclosed systems may permit a user to launch a single-node EdgeStore private network. In some implementations, a user may need to first install an EdgeStore private network and setup the EdgeStore environment to launch a single node network, as previously described. Thereafter, the disclosed systems may enable certain operations, such as performing an upload/download of the image file.

In some embodiments, the edge node may provide a REST API for the user to download the image files with the key and relative path of the image file. By default, the REST server may be configured to run at a predetermined port (e.g., at port 8080), but changes to the port settings may be made by the user via changes to a configuration file. For example, the user can use a browser window and go to a given URL to make this modification.

In other aspects, the disclosed systems may permit users to upload/download a directory containing multiple images to the network. Accordingly, the disclosed systems can permit users to retrieve multiple images under a data folder through a given URL. In some aspects, the user may need to pass in the relative filepath (relpath) parameter in the commands to indicate relative path of each image file as a query.

Figure 10:
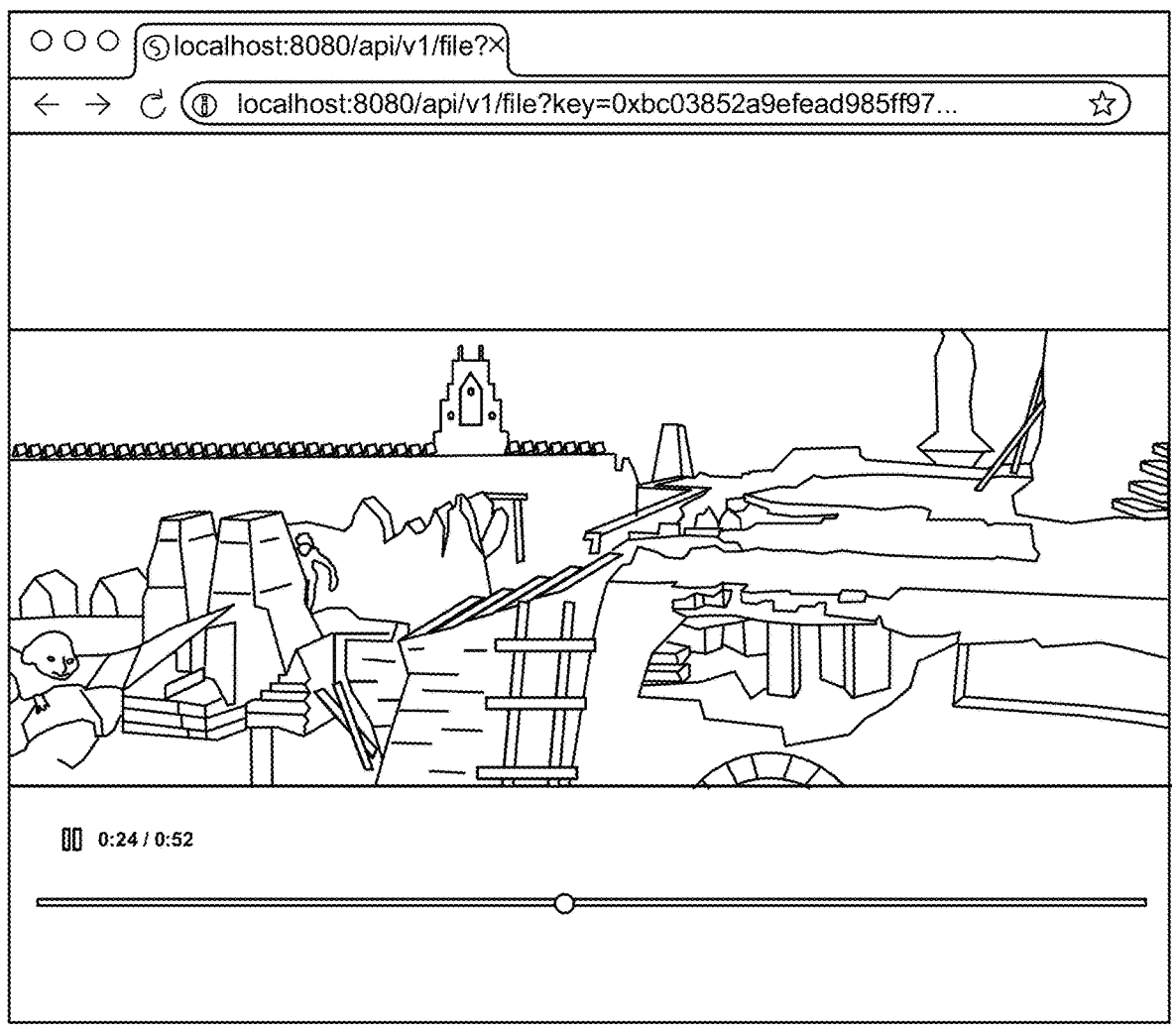
FIG. 10 shows an illustrative screenshot demonstrating a single node private network for mp4 video file storage and serving, according to one embodiment of the present invention.

FIG. 10. shows an illustrative screenshot 1000 demonstrating a single node private network for mp4 video file storage and serving, according to one embodiment of the present invention. In this example, the disclosed systems may permit a user to upload and/or retrieve video files by launching a single-node EdgeStore private network after installing and setting up the EdgeStore environment and launch a single node network. Again, the disclosed systems may permit the edge node to provide a REST API for the users to playback videos uploaded to the network with the keys and the relative path of the video file. In some embodiments, the disclosed systems may permit a user to see the video played in a browser window on a user device. In particular, diagram 1000 shows a video being played back at a particular address (e.g., URL), and further shows control elements such as a playback time control, sound controls, and the like.

Figure 11:
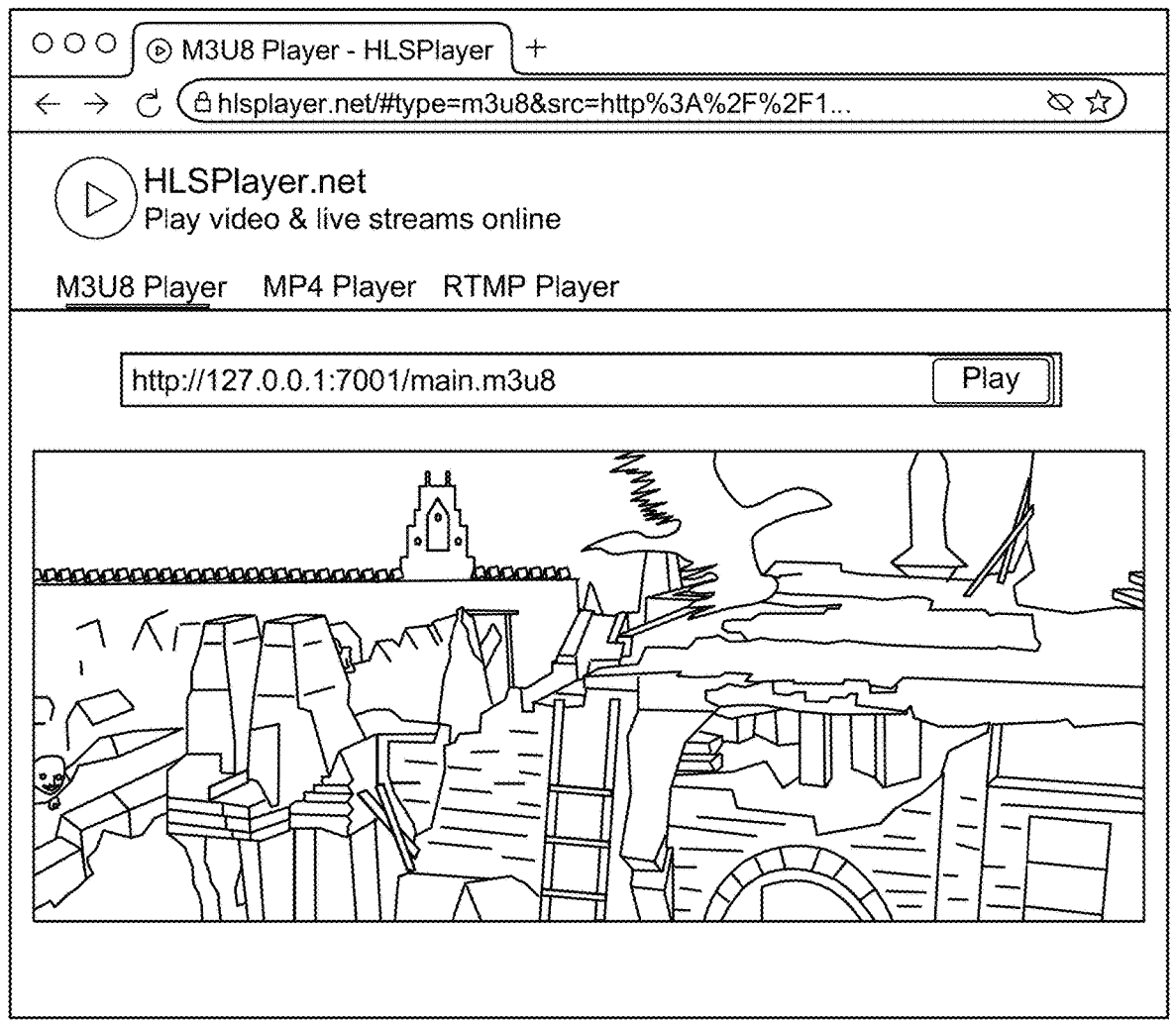
FIG. 11 shows an illustrative screenshot demonstrating a multi-node private network for HLS video storage and serving, according to one embodiment of the present invention.

FIG. 11. shows an illustrative screenshot 1100 demonstrating a multi-node private network for HLS video storage and serving, according to one embodiment of the present invention. In this example, a first user may upload an HLS video on demand (VoD) stream to the decentralized network through a first node, and video stream may be played on a second node for a second user. In order to start the HLS server, the first user may interact with the disclosed systems to learn that the REST server of the second node is running at a particular port (e.g., port 8082), and the first user can pass in the port address accordingly. This way the HLS server may call the RPC API of the second node to download the HLS video stream from the EdgeStore network.

The second user may further perform a playback of the HLS stream by performing various operations as follows. First, the second may open an HLS tool provided by the disclosed systems, for example, by accessing an HLS playback tool in a browser at a given URL (e.g., https://www.hlsplayer.net/). Next, the second user may enter a specific URL associated with the HLS stream (e.g., http://127.0.0.1:7001/main.m3u8) in an input box associated with the HLS tool, and then the second user may press a "Play" button to play the HLS stream. In FIG. 11, the browser shows different options for video players (e.g., M3U8 player, a MP4 player, an RTMP player, and the like) to play a given video inputted at a particular address. In other embodiments, a user may download and/or play the video using his or her own video player as needed, assuming adequate permissions have been obtained.

In order to store and stream HLS content via Multi-Node Networks over the Internet, users may first setup a multi-node network over the Internet by modifying a configuration parameter in a configuration file (e.g., a p2p.seeds configuration file in a config.yaml file) for the nodes. For example, three nodes may be enabled to deploy on three different cloud instances. In some embodiments, not all nodes are on the same network. For example, a first node may be run in a first cloud network (e.g., in GCP), a second node may be run in a second cloud network (e.g., AWS), and a third node may be on a user's local computer. Further, the disclosed systems may permit users to configure firewall rules in order to allow inbound/outbound traffics on the corresponding ports (e.g., a p2p.port), by which nodes are enabled to communicate with each other. Users may be able to connect to each other and form a unified permanent storage network. In this implementation, each EdgeStore node may cache popular contents locally. Therefore, the network also acts as a decentralized content delivery network (dCDN) for any type of file.

Figure 12:
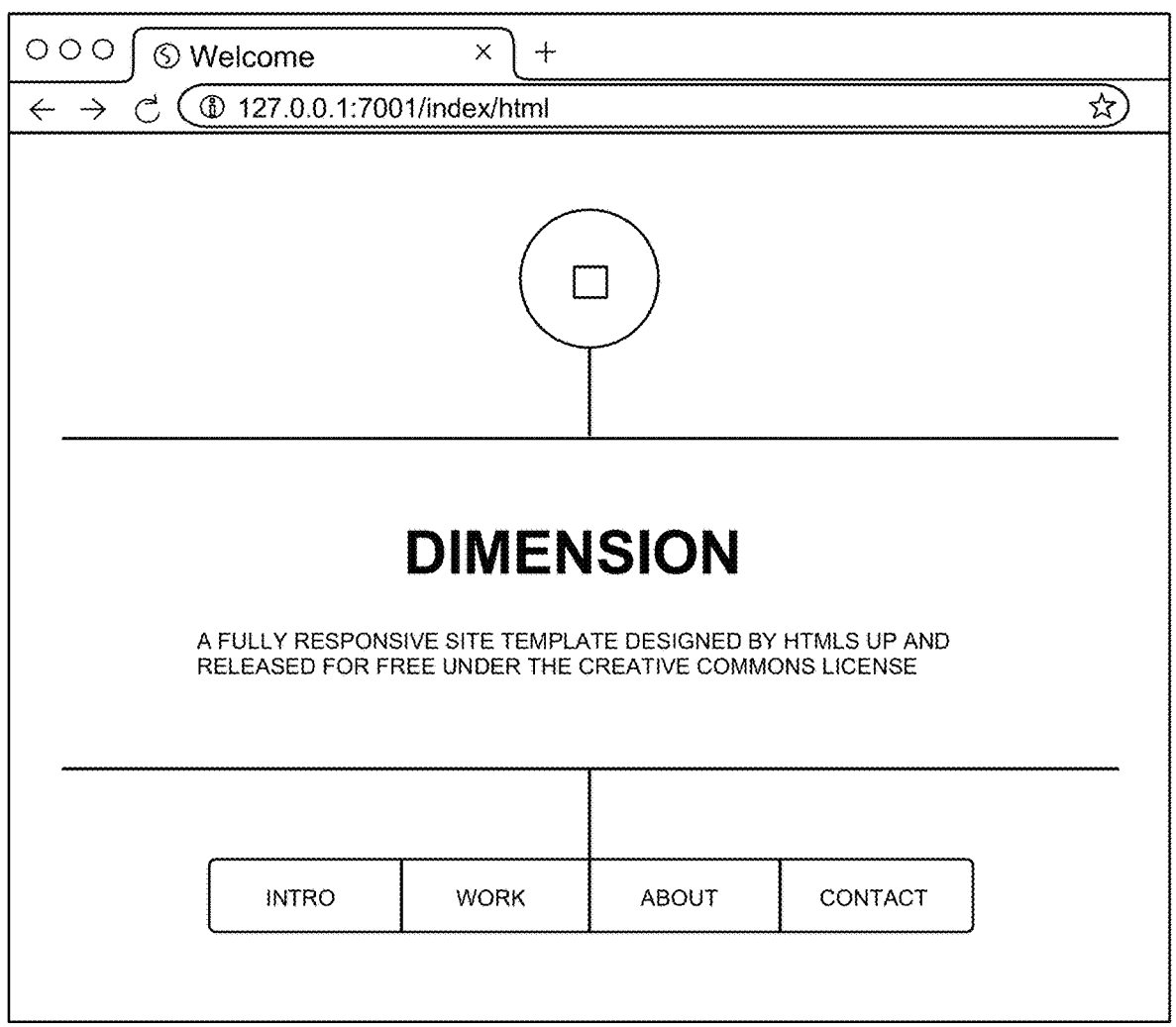
FIG. 12 shows an illustrative screenshot demonstrating a decentralized edge store network serving as a permanent storage and a decentralized content delivery network (dCDN), according to one embodiment of the present invention.

FIG. 12. shows an illustrative screenshot 1200 demonstrating a decentralized edge store network serving as a permanent storage and a decentralized content delivery network (dCDN), according to one embodiment of the present invention. In this example, the disclosed systems is enabled to serve web apps. In particular, a web app may be uploaded to the THETA EdgeStore Network and served with a javascript program (e.g., Node.js) or similar program. In some examples, the EdgeStore network may serve as a permanent storage network for the Web App. Moreover, each EdgeStore node may cache popular contents locally. In some embodiments, the network may also be treated as a dCDN for the Web App.

Figure 13:
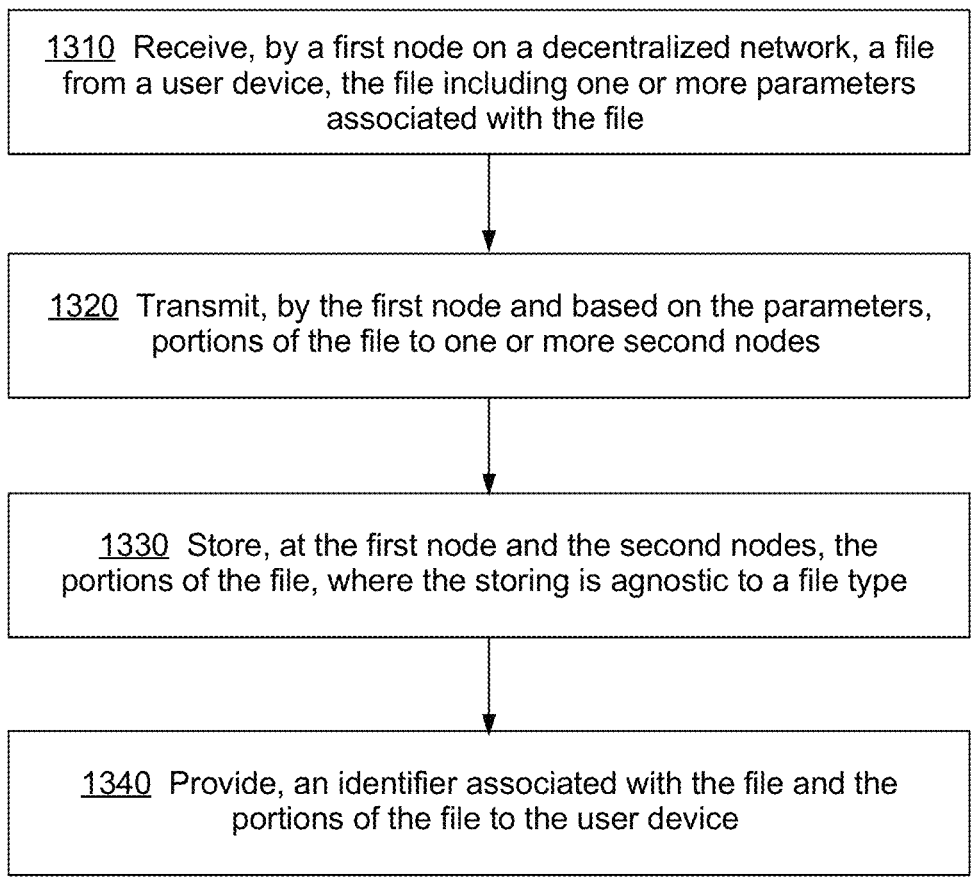
FIG. 13 shows a diagram for example operations associated with the disclosed systems, according to one embodiment of the present invention.

FIG. 13 shows a diagram 1300 for example operations associated with the disclosed systems, in accordance with example embodiments of the present invention. At step 1310, the disclosed systems may receive, by a first node on a decentralized network, a file from a user device, the file including one or more parameters associated with the file. At step 1320, the disclosed systems may transmit, by the first node and based on the parameters, portions of the file to one or more second nodes. At step 1330, the disclosed systems may store, at the first node and the second nodes, the portions of the file, wherein the storing is agnostic to a file type associated with the file. At step 1340, the disclosed systems may provide, an identifier associated with the file and the portions of the file to the user device.

Figure 14:
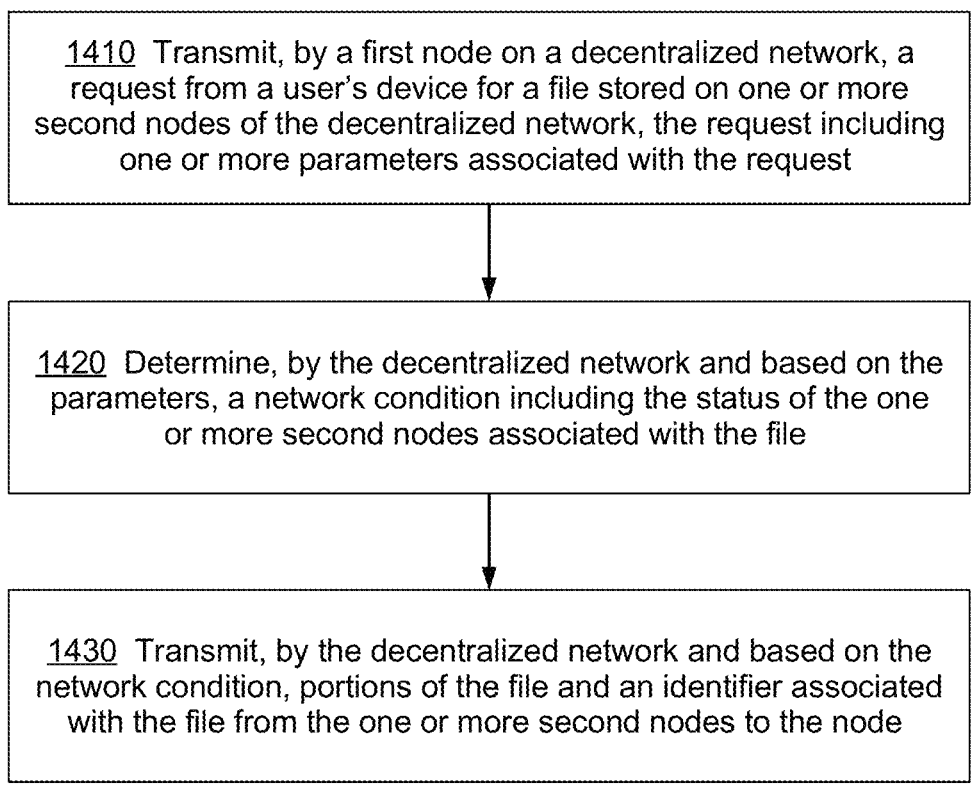
FIG. 14 shows another diagram for example operations associated with the disclosed systems, according to one embodiment of the present invention.

FIG. 14 shows another diagram 1400 for example operations associated with the disclosed systems, in accordance with example embodiments of the present invention. At step 1410, the disclosed systems may transmit, by a first node on a decentralized network, a request from a user's device for a file stored on one or more second nodes of the decentralized network, the request including one or more parameters associated with the request. At step 1420, the disclosed systems may determine, by the decentralized network and based on the parameters, a network condition including the status of the one or more second nodes associated with the file. At step 1430, the disclosed systems may transmit, by the decentralized network and based on the network condition, portions of the file and an identifier associated with the file from the one or more second nodes to the first node.

Exemplary Implementations

The following sections describe some example user interactions with exemplary implementations of the disclosed systems, for example, to install and set up software related to disclosed systems and to interact with various features of the disclosed systems using command line interfaces (CLIs), application programming interfaces (APIs), and the like.

More specifically, users may install an EdgeStore software and set up the environment as described herein. A user may be provided with instructions (e.g., via a guide) to download and install a precompiled THETA EdgeStore binary. Further, the user may be provided with steps to launch one or more private EdgeStore networks on a device such as a user's local computer. The THETA EdgeStore binary may be updated over time (e.g., via automated software updates).

Users may interact with the EdgeStore network with commands such as CLI commands. For example, users may query the status of the node via a query command. User may also upload or download data to or from the EdgeStore network using an upload or a download command via a CLI. Alternatively, users may interact with EdgeStore nodes via an API. The API may include corresponding references (e.g., a remote procedure call (RPC) APIs and REST APIs) which may be used for interacting with an edge node (e.g., query node state, upload/retrieve files).

In various implementations, the exemplary use cases as disclosed herein may be run on a user device such as a local computer or other devices such as a multi-node network over the Internet. For the latter approach, the disclosed systems may modify (e.g., via a user interaction) a corresponding configuration file (e.g., p2p.seeds config in a config.yaml file) associated with the nodes. In a simple example, the disclosed system may deploy a network consisting of three nodes, with the first node running in a first cloud-based network, the second running in a second cloud-based network, and the third on a local device such as a local computer. The disclosed systems may configure one or more security parameters (e.g., firewall rules) to allow inbound/ outbound traffic on an associated port (e.g., a p2p.port), so that the nodes can communicate with each other. Once the parameters are set up, the disclosed systems may enable edge store nodes to connect to each other and form a unified storage and delivery network.

Further details on CLI commands are available at https:// docs.thetatoken.org/docs/theta-edge-store-setup and https:// docs.thetatoken.org/docs/theta-edge-store-cli-commands, the entire disclosures of which are hereby incorporated by reference in their entireties herein.

For example, the user may use various representative commands (e.g., CLI commands) below to launch a multi-node edge node private network (e.g., a three-node network):

```
#Copy over the configs
cd ~/edge-store-playground
mkdir -p privatenet/multi-node
#Copy over the 'config.yaml' files for the three nodes
cp  -r./theta-edge-store-demos/configs/multi-node/*privatenet/multi-node
#Start the 1st edgestore node in terminal #1. Its RPC runs at port 19888 cd ~/edge-store-playground
./bin/edgestore start  --config=./privatenet/multi-node/node1 --password=qwertyuiop
#Start the 2nd edgestore node in terminal #2. Its RPC runs at port 19889 cd ~/edge-store-playground
./bin/edgestore start  --config=./privatenet/multi-node/node2 --password=qwertyuiop
#Start the 3rd edgestore node in terminal #3. Its RPC runs at port 19890 cd ~/edge-store-playground
./bin/edgestore start  --config=./privatenet/multi-node/node3 --password=qwertyuiop
```

When the disclosed systems are running a multi-node network on a user's local device, the users may choose a particular node to interact with by querying against the device's respective port (e.g., an RPC port) with a respective variable (e.g., a corresponding environmental (env) variable). For example, the user may query the peers of each node with the following:

```
#Query the peers of the 1st node whose RPC runs at port 19888
#Note that the RPC server of the three nodes are running at 19888, 19889, and 19890
#respectively as specified by the rest.port config in their config.yaml files.
EDGESTORERPCENDPOINT=http://127.0.0.1:19888/rpc./bin/edgestore query peers.
#Query the peers of the 2nd node whose RPC runs at port 19889    EDGESTORERPCENDPOINT=http://127.0.0.1:19889/rpc./bin/edgestore query peers.
#Query the peers of the 3rd node whose RPC runs at port 19890    EDGESTORERPCENDPOINT=http://127.0.0.1:19890/rpc./bin/edgestore query peers.
```

Furthermore, the user may put a text data string to the first node, and then get the data from the second and the third node, for example, using the code below:

```
#Upload data to the 1st node whose RPC runs at port 19888 (assuming users are running EDGESTORERPCENDPOINT=http://127.0.0.1:19888/rpc./bin/edgestore data put --val="Hello World"
```

```
#The above command should return the following
   response
#{
#"key":"0x022d5ed71ca8f872cc2a3a34976aaad77be8e
   18ee50268c213abed79e113c618, #success": true
#}
#Retrieve the data from the 2nd node whose RPC runs at
   port   19889   EDGESTORERPCENDPOINT=http://
   127.0.0.1:19889/rpc./bin/edgestore   data   get
   --key=0x02
#The above command should return the following
   response
#{
#"val": "Hello World"
#}
#Retrieve the data from the 3rd node whose RPC runs at
   port   19890   EDGESTORERPCENDPOINT=http://
   127.0.0.1:19890/rpc./bin/edgestore   data   get
   --key=0x02
#The above command should return the following
   response.
#{
#"val": "Hello World"
#}
```

In another example, the disclosed systems may upload a file to the edge store network through a first node and retrieve the file from the third node:

```
#Upload a directory 'data' containing two image files
   'smiley_explorer.png'   and   'theta_network.jpg'
   EDGESTORERPCENDPOINT=http://127.0.0.1:
   19888/rpc./bin/edgestore file put --path="th #
#The above command should return the following
   response
#{
#"key":"0xdacc9a23035a458f21aa0cb51189d715cb5
   c43d7ff4c0227cca5c25eeef3d5b4",
#"relpath": "data",
#"success": true
#}
#Retrieve the data folder along with the two images files
   from           the           third           node:
   EDGESTORERPCENDPOINT=http://127.0.0.1:
   19890/rpc./bin/edgestore file get --key=0xda
#The above command should return the following
   response, which means the two images under the 'pri-
   vatenet/multi-node/node3/storage/file_cache/
   0xdacc9a23035a458f21aa0'
#{
#"path":       "privatenet/multi-node/node3/storage/file-
   _cache/0xdacc9a23035a458f21a
#}
Is        privatenet/multi-node/node3/storage/file_cache/
   0xdacc9a23035a458f21aa0cb51189d71
#The above 'ls' command should list the following two
   files
#smiley_explorer.png theta_network.jpg
```

In addition to the CLI commands, the disclosed systems may permit users to interact with an edge store node through a remote procedure call (RPC) and/or a REST APIs. The RPC APIs may permit users to interact with an edge node (e.g., query node state and upload and/or, receive files). The REST APIs may be utilized for content serving (e.g., serving a particular file such as a PNG image file or, a PDF file).

In various implementations, the disclosed systems may use an RPC APIs that include various commands such as GetVersion to get an EdgeStore version, GetStatus to get EdgeStore status, GetPeers to get edge store peers, PutData to upload text data string, GetData to retrieve text data string, PutFile to upload file/directory, and GetFile to retrieve file/directory. For example, the getPeers API may return the peers of an edge store node. The method may be called edgestore.GetPeers and may return the IDs of peers the edge store node is currently connected to. The PutFile API may allow a user to upload a file or a directory the edge store network. This API may return the key for the file/directory retrieval. A directory to be uploaded may have multiple levels of sub-directories, and the disclosed systems may process this API recursively. Further details on API references are available at https://docs.thetatoken.org/docs/theta-edge-store-api-references#getfile, the entire disclosure is hereby incorporated by reference in its entirety herein.

Implementation Using Computer Program Products, Methods, and Computing Entities

Exemplary System Architecture

Figure 15:
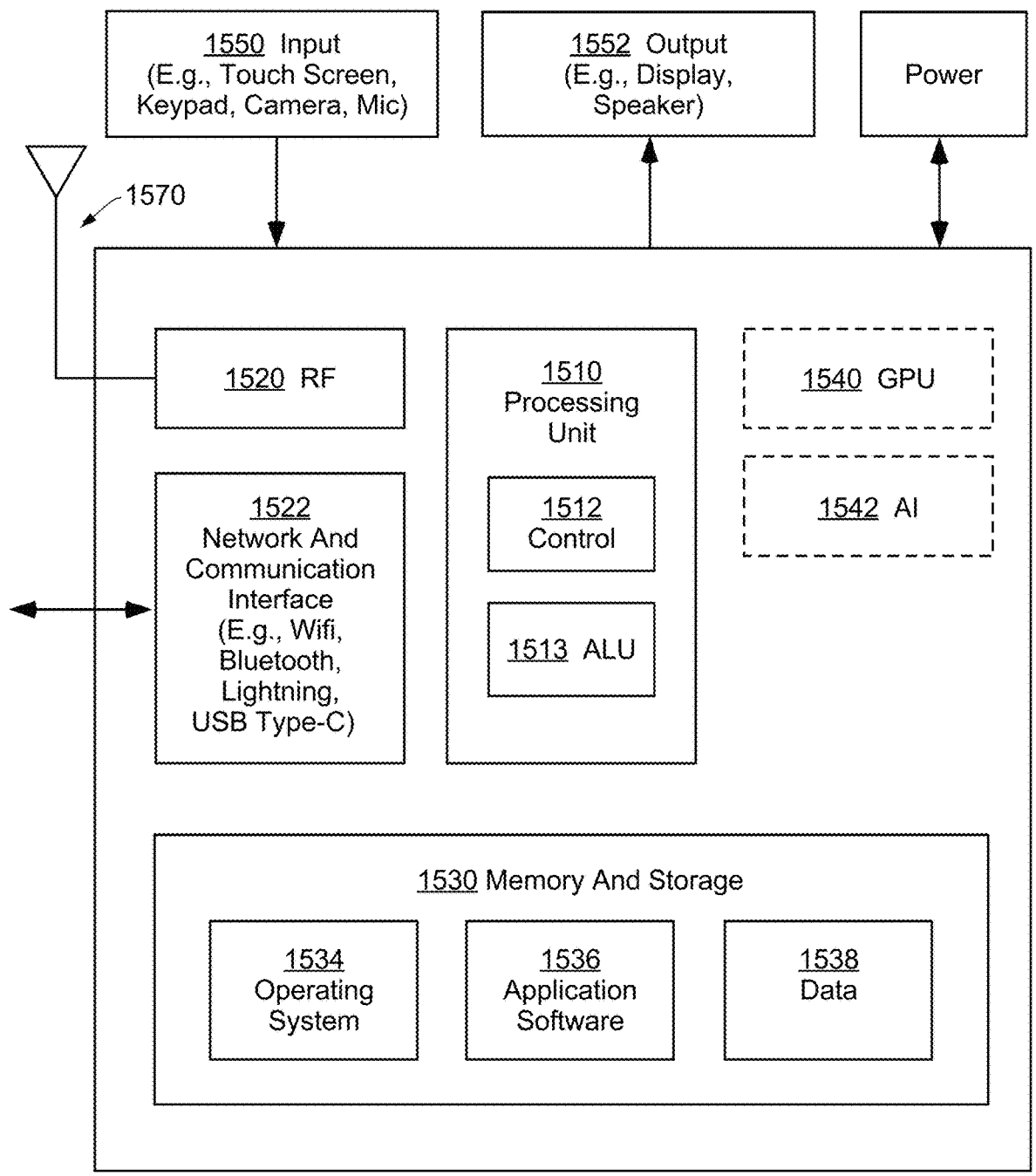
FIG. 15 is an exemplary schematic diagram of a user computing entity for implementing a peer edge node used for decentralized storage, according to example embodiments of the present invention.
Figure 16:
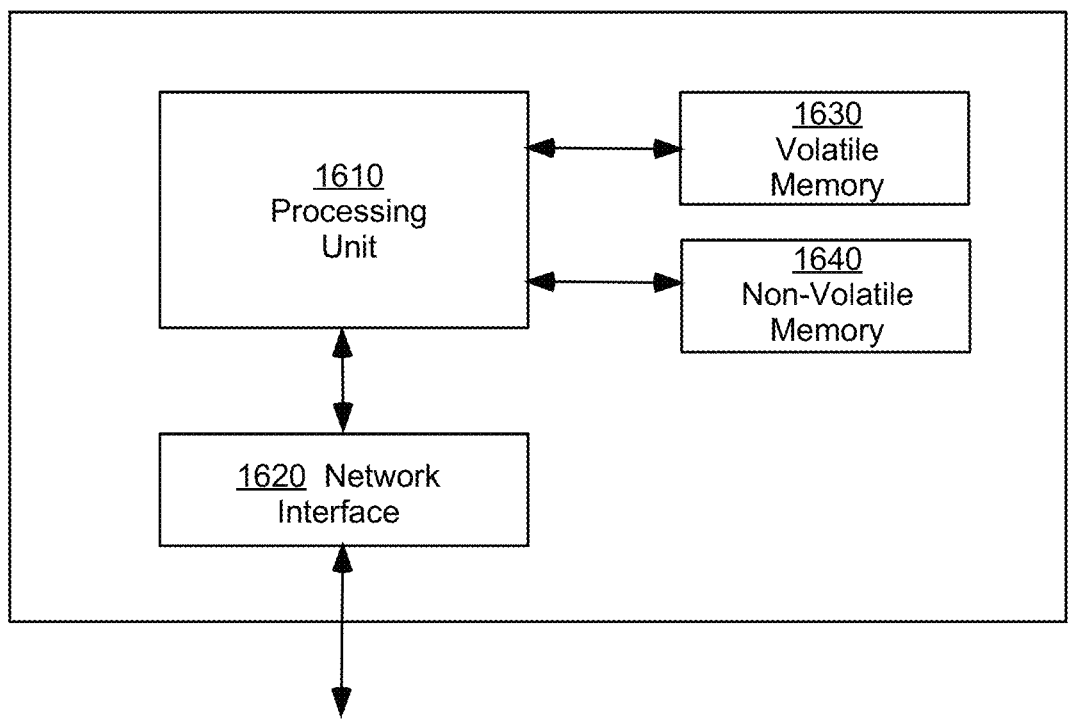
FIG. 16 is an exemplary schematic diagram of a management computing entity for implementing a server node used for decentralized storage, according to example embodiments of the present invention.

An exemplary embodiment of the present disclosure may include one or more end user computing entities 1500, blockchain nodes, or other management computing entities 1500, as shown in FIGS. 15 and 16. Each of these components, entities, devices, systems, and similar words used herein interchangeably may be in direct or indirect communication with, for example, one another over the same or different wired or wireless networks. Additionally, while FIGS. 15 and 16 illustrate the various system entities as separate, standalone entities, the various embodiments are not limited to this particular architecture. Both user computing entity 1500 and management computing entity 1600 may be implemented using similar, or even identical, hardware elements.

Exemplary User Computing Entity

FIG. 15 is an exemplary schematic diagram of a user computing entity for implementing a peer node such as an edge storage node or an edge computing node, according to exemplary embodiments of the present invention. An end user computing device 1500 capable of performing a storage task may include one or more components as shown. As will be recognized, these architectures and descriptions are provided for exemplary purposes only and are not limiting to the various embodiments.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, Internet of Things (IoT) devices, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, retrieving, operating on, processing, displaying, storing, determining, creating, generating, monitoring, evaluating, comparing, and/or similar terms used herein interchangeably. In various embodiments, these functions, operations, and/or processes can be performed on data, content, information, and/or similar terms used herein interchangeably. Furthermore, a peer storage node, a source node, or a computational task initiator/server may also be implemented according to the exemplary schematic diagram shown in FIG. 16, possibly in the cloud, and possibly with logically or physically distributed architectures.

As shown in FIG. 15, user computing entity 1500 may include an antenna 1570, a radio transceiver 1520, and a processing unit 1510 that provides signals to and receives signals from the transceiver. The signals provided to and received from the transceiver may include signaling information in accordance with air interface standards of applicable wireless systems. In this regard, user computing entity 1500 may be capable of operating with one or more air interface standards, communication protocols, modulation types, and access types. More particularly, user computing entity 1500 may operate in accordance with any of a number of wireless communication standards and protocols. In some embodiments, user computing entity 1500 may operate in accordance with multiple wireless communication standards and protocols, such as 5G, UMTS, FDM, OFDM, TDM, TDMA, E-TDMA, GPRS, extended GPRS, CDMA, CDMA2000, 1×RTT, WCDMA, TD-SCDMA, GSM, LTE, LTE advanced, EDGE, E-UTRAN, EVDO, HSPA, HSDPA, MDM, DMT, Wi-Fi, Wi-Fi Direct, WiMAX, UWB, IR, NFC, ZigBee, Wibree, Bluetooth, and/or the like. Similarly, user computing entity 1500 may operate in accordance with multiple wired communication standards and protocols, via a network and communication interface 1522.

Via these communication standards and protocols, user computing entity 1500 can communicate with various other computing entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). User computing entity 1500 can also download changes, add-ons, and updates, for instance, to its firmware, software (e.g., including executable instructions, applications, program modules), and operating system.

In some implementations, processing unit 1510 may be embodied in several different ways. For example, processing unit 1510 may be embodied as one or more complex programmable logic devices (CPLDs), microprocessors, multi-core processors, coprocessing entities, application-specific instruction-set processors (ASIPs), microcontrollers, and/or controllers. Further, the processing unit may be embodied as one or more other processing devices or circuitry. The term circuitry may refer to an entirely hardware embodiment or a combination of hardware and computer program products. Thus, processing unit 1510 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 1510 may be configured for a particular use or configured to execute instructions stored in volatile or non-volatile media or otherwise accessible to the processing unit. As such, whether configured by hardware or computer program products, or by a combination thereof, processing unit 1510 may be capable of performing steps or operations according to embodiments of the present invention when configured accordingly.

In some embodiments, processing unit 1510 may comprise a control unit 1512 and a dedicated arithmetic logic unit 1513 (ALU) to perform arithmetic and logic operations. In some embodiments, user computing entity 1500 may comprise a graphics processing unit 1540 (GPU) for specialized image and video rendering or transcoding tasks, and/or an artificial intelligence (AI) accelerator 1542, specialized for applications including artificial neural networks, machine vision, and machine learning. In some embodiments, processing unit 1510 may be coupled with GPU 1540 and/or AI accelerator 1542 to distribute and coordinate processing tasks.

In some embodiments, user computing entity 1500 may include a user interface, comprising an input interface 1550 and an output interface 1552, each coupled to processing unit 1510. User input interface 1550 may comprise any of a number of devices or interfaces allowing the user computing entity 1500 to receive data, such as a keypad (hard or soft), a touch display, a mic for voice/speech, and a camera for motion or posture interfaces. User output interface 1552 may comprise any of a number of devices or interfaces allowing user computing entity 1500 to provide content and information to a user, such as through a touch display, or a speaker for audio outputs. In some embodiments, output interface 1552 may connect user computing entity 1500 to an external loudspeaker or projector, for audio or visual output.

User computing entity 1500 may also include volatile and/or non-volatile storage or memory 1530, which can be embedded and/or may be removable. A non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store an operating system 1534, application software 1536, data 1538, databases, database instances, database management systems, programs, program modules, SDKs, scripts, source code, object code, byte code, compiled code, interpreted code, machine code, executable instructions, and/or the like to implement the functions of user computing entity 1500. As indicated, this may include a user application that is resident on the entity or accessible through a browser or other user interface for communicating with a management computing entity and/or various other computing entities.

In some embodiments, user computing entity 1500 may include location determining aspects, devices, modules, functionalities, and/or similar words used herein interchangeably. For example, user computing entity 1500 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites. Alternatively, the location information may be determined by triangulating the user computing entity's position in connection with a variety of other systems, including cellular towers, Wi-Fi access points, and/or the like. Similarly, user computing entity 1500 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters. Location information thus obtained may be used in determining nearby peers for data distribution and retrieval.

In some embodiments, two or more users may establish a connection between their computing devices using any of the networking protocols listed previously, and any peer-to-peer protocols including BitTorrent, or that provided by the THETA network. In some embodiments, the user computing devices may use a network interface such as 1522 to communicate with various other computing entities, to exchange data content, information, and/or similar terms used herein interchangeably that can be transmitted, received, operated on, processed, displayed, stored, and/or the like.

In some embodiments, data (e.g., audio, video, etc.) may be downloaded by one or more user computing devices to a server such as shown in FIG. 16 when the device accesses a network connection, such as a wireless access point or hotspot. The data transfer may be performed using protocols like file transfer protocol (FTP), MQ telemetry transport (MQTT), advanced message queuing protocol (AMQP), hypertext transfer protocol (HTTP), and HTTP secure (HTTPS). These protocols may be made secure over transport layer security (TLS) and/or secure sockets layer (SSL).

Exemplary Management Computing Entity

FIG. 16 is an exemplary schematic diagram of a management computing entity or server node 1600, for implementing a peer node such as an edge storage node, an edge computing node, or a blockchain node in the THETA decentralized network, according to exemplary embodiments of the present invention. The terms computing entity, computer, entity, device, system, and/or similar words used herein interchangeably are explained in detail with reference to user computing entity 1500. Note computing entity 1500 is annotated as a user device, while computing entity 1600 is annotated as a management device. However, it would be understood by persons of ordinary skill in the art that either may be used for implementing peer storage, edge computing, or blockchain functionalities.

As indicated, in one embodiment, management computing entity 1600 may include one or more network or communications interface 1620 for communicating with various computing entities, such as by communicating data, content, information, and/or similar terms used herein interchangeably that can be transmitted, received, operated on, processed, displayed, stored, and/or the like. For instance, management computing entity 1600 may communicate with a user computing device 1500 and/or a variety of other computing entities. Network or communications interface 1620 may utilize a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 1600 may be configured to communicate via wireless external communication networks using any of a variety of standards and protocols as discussed with reference to user computing device 1500.

As shown in FIG. 16, in one embodiment, management computing entity 1600 may include or be in communication with one or more processing unit 1610 (also referred to as processors, processing circuitry, processing element, and/or similar terms used herein interchangeably) that communicate with other elements within the management computing entity 1600. As will be understood, processing unit 1610 may be embodied in a number of different ways. For example, as one or more CPLDs, microprocessors, multi-core processors, coprocessing entities, ASIPs, microcontrollers, and/or controllers, in the form of integrated circuits, application specific integrated circuits (ASICs), field programmable gate arrays (FPGAs), programmable logic arrays (PLAs), hardware accelerators, other circuitry, and/or the like. As will therefore be understood, processing unit 1610 may be configured for a particular use or configured to execute instructions stored in volatile or non-volatile media 1630 and 1640. As such, whether configured by hardware or computer program products, or by a combination thereof, processing unit 1610 may be capable of performing steps or operations according to embodiments of the present disclosure when configured accordingly.

Although not shown explicitly, management computing entity 1600 may include or be in communication with one or more input elements, such as a keyboard, a mouse, a touch screen/display, a camera for motion and movement input, a mic for audio input, a joystick, and/or the like. Management computing entity 1600 may also include or be in communication with one or more output elements such as speaker, screen/display, and/or the like.

In various embodiments, one or more of the components of management computing entity 1600 may be located remotely from other management computing entity components, such as in a distributed system or in the cloud. Furthermore, one or more of the components may be combined and additional components performing functions described herein may be included in the management computing entity 1600. Thus, the management computing entity 1600 can be adapted to accommodate a variety of needs and circumstances. As will be recognized, these architectures and descriptions are provided for exemplary purposes only and are not limiting to the various embodiments.

Additional Implementation Details

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skills in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g., any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware may also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of streaming content and information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module, or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although specific embodiments of the disclosure have been described, one of ordinary skills in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skills in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A method for decentralized storage, comprising:
    dividing, by a source node in a decentralized network, a file into a plurality of file portions;
    for each given file portion in the plurality of file portions, locating a corresponding peer storage node in the decentralized network,
        wherein a distance between the corresponding peer storage node and the given file portion is below a given threshold,
        wherein the distance is computed based on an identifier of the corresponding peer storage node and an identifier of the given file portion, and
        wherein the given threshold is associated with a storage capacity of the corresponding peer storage node;
    transmitting, by the source node, each given file portion to the corresponding peer storage node; and
    generating, by the source node, a file identifier for the file, based on the identifiers of the plurality of file portions.

2. The method of claim 1, wherein for each given file portion in the plurality of file portions, the locating the corresponding peer storage node in the decentralized network comprises:
    gossiping the identifier of the given file portion through the decentralized network; and
    receiving a location notification from the corresponding peer storage node, wherein the location notification indicates that the distance between the corresponding peer storage node and the given file portion is below the given threshold associated with the storage capacity of the corresponding peer storage node.

3. The method of claim 1, wherein for each given file portion in the plurality of file portions, the locating the corresponding peer storage node in the decentralized network comprises:
    retrieving, by the source node, a list of registered peer storage nodes from a blockchain; and
    selecting the corresponding peer storage node from the list of registered peer storage nodes.

4. The method of claim 1, wherein the identifier of the corresponding peer storage node and the identifier of the given file portion are computed using a hash function.

5. The method of claim 1, wherein the identifier of the corresponding peer storage node is computed based on a crypto wallet address associated with the corresponding peer storage node.

6. The method of claim 1, wherein the generating of the file identifier comprises performing a vector commitment scheme on the identifiers of the plurality of file portions.

7. The method of claim 1, further comprising:
    submitting the file identifier to a smart contract.

8. The method of claim 1, further comprising:
    performing a distributed hash table (DHT) lookup using the file identifier, to determine the identifier of each of the plurality of file portions;
    for each given file portion of the plurality of file portions, performing a DHT lookup on the identifier of the given file portion to determine an address for a peer storage node storing the given file portion;
    retrieving each given file portion from the peer storage node storing the given file portion, using the determined address; and
    assembling the retrieved file portions into the file.

9. A source node system in a decentralized network for decentralized storage, comprising:
    at least one processor; and
    a non-transitory physical medium for storing program code accessible by the processor, the program code when executed by the processor causes the processor to:
        divide a file into a plurality of file portions;
        for each given file portion in the plurality of file portions, locate a corresponding peer storage node in the decentralized network,
            wherein a distance between the corresponding peer storage node and the given file portion is below a given threshold,
            wherein the distance is computed based on an identifier of the corresponding peer storage node and an identifier of the given file portion, and
            wherein the given threshold is associated with a storage capacity of the corresponding peer storage node;
        transmit each given file portion to the corresponding peer storage node; and generate a file identifier for the file, based on the identifiers of the plurality of file portions.

10. The source node system of claim 9, wherein for each given file portion in the plurality of file portions, the program code to locate the corresponding peer storage node, when executed by the processor, causes the processor to:
    gossip the identifier of the given file portion through the decentralized network; and
    receive a location notification from the corresponding peer storage node, wherein the location notification indicates that the distance between the corresponding peer storage node and the given file portion is below the given threshold associated with the storage capacity of the corresponding peer storage node.

11. The source node system of claim 9, wherein for each given file portion in the plurality of file portions, the program code to locate the corresponding peer storage node, when executed by the processor, causes the processor to:
    retrieve a list of registered peer storage nodes from a blockchain; and
    select the corresponding peer storage node from the list of registered peer storage nodes.

12. The source node system of claim 9, wherein the identifier of the corresponding peer storage node and the identifier of the given file portion is computed using a hash function.

13. The source node system of claim 9, wherein the identifier of the corresponding peer storage node is computed based on a crypto wallet address associated with the corresponding peer storage node.

14. The source node system of claim 9, wherein the program code to generate the file identifier, when executed by the processor, causes the processor to:
    perform a vector commitment scheme on the identifiers of the plurality of file portions.

15. The source node system of claim 9, wherein the program code when executed by the processor further causes the processor to:
    submit the file identifier to a smart contract.

16. The source node system of claim 9, wherein the program code when executed by the processor further causes the processor to:
    perform a distributed hash table (DHT) lookup using the file identifier, to determine the identifier of each of the plurality of file portions;
    for each given file portion of the plurality of file portions, perform a DHT lookup on the identifier of the given file portion to determine an address for a peer storage node storing the given file portion;
    retrieve each given file portion from the peer storage node storing the given file portion, using the determined address; and
    assemble the retrieved file portions into the file.

17. A method for decentralized storage, comprising:
    receiving, by a peer storage node, a file portion of a file, wherein the file is divided into a plurality of file portions by a source node;
    computing, by the peer storage node, a distance based on an identifier of the received file portion, and an identifier of the peer storage node;
    determining, by the peer storage node, whether the distance is below a threshold associated with a storage capacity of the peer storage node; and
    storing the received file portion in the peer storage node in response to determining that the distance is below the threshold.

18. The method of claim 17, wherein the identifier of the peer storage node and the identifier of the received file portion are computed using a hash function.

19. The method of claim 17, wherein the identifier of the peer storage node is computed based on a crypto wallet address associated with the peer storage node.

20. The method of claim 17, further comprising:
    retrieving a random number from a blockchain;
    computing a reward hash, based on the received file portion and the random number; and
    submitting the reward hash to a smart contract on the blockchain.

* * * * *